US007644120B2

(12) United States Patent
Todorov et al.

(10) Patent No.: US 7,644,120 B2
(45) Date of Patent: Jan. 5, 2010

(54) INDUSTRIAL PROCESS CONTROL DATA ACCESS SERVER SUPPORTING MULTIPLE CLIENT DATA EXCHANGE PROTOCOLS

(75) Inventors: Ivan A. Todorov, Aliso Viejo, CA (US); Louis D. Ross, Corvallis, OR (US); Michael Hadrich, Munich (DE); Rainer Hessmer, Rancho Santa Margarita, CA (US)

(73) Assignee: Invensys Systems, Inc., Foxboro, MA (US)

( * ) Notice: Subject to any disclaimer, the term of this patent is extended or adjusted under 35 U.S.C. 154(b) by 1611 days.

(21) Appl. No.: 09/954,508

(22) Filed: Sep. 14, 2001

(65) Prior Publication Data

US 2002/0116453 A1    Aug. 22, 2002

Related U.S. Application Data

(60) Provisional application No. 60/232,731, filed on Sep. 15, 2000.

(51) Int. Cl.
*G06F 15/16* (2006.01)
(52) U.S. Cl. .................. 709/203; 709/206; 709/217; 709/218; 709/250; 711/157
(58) Field of Classification Search .......... 709/203, 709/206, 217–219, 250, 220; 711/167; 710/310; 379/242, 246
See application file for complete search history.

(56) References Cited

U.S. PATENT DOCUMENTS 5,386,566 A * 1/1995 Hamanaka et al. .......... 719/310

| | | |
|---|---|---|
| 5,491,791 A | 2/1996 | Glowny et al. |
| 5,812,768 A | 9/1998 | Pagé et al. |
| 5,845,283 A | 12/1998 | Williams et al. |
| 5,872,966 A | 2/1999 | Burg |
| 5,884,046 A * | 3/1999 | Antonov ............ 709/238 |
| 5,887,171 A | 3/1999 | Tada et al. |
| 5,978,570 A * | 11/1999 | Hillis .............. 711/200 |
| 5,987,633 A | 11/1999 | Newman et al. |
| 5,991,820 A * | 11/1999 | Dean .............. 719/312 |

(Continued)

FOREIGN PATENT DOCUMENTS

| | | |
|---|---|---|
| EP | 0 463 764 A | 1/1992 |
| EP | 0 909 058 A | 4/1999 |
| WO | 96/26588 A | 8/1996 |
| WO | 00/39674 A | 7/2000 |
| WO | PCT/US98/17622 A1 | 9/2000 |

OTHER PUBLICATIONS

International Search Report in corresponding PCT Application No. PCT/US01/28955, dated Dec. 6, 2001.

(Continued)

*Primary Examiner*—Thanh Tammy Nguyen
(74) *Attorney, Agent, or Firm*—Leydig, Voit & Mayer Ltd.

(57) ABSTRACT

A method and process control data server system architecture are disclosed for providing process data to a variety of client applications via a plurality of differing data sharing standards. The system architecture incorporates a ready platform for subsequently added client application data exchange protocols. In an exemplary embodiment, a set of standard interface definitions between client application data exchange protocol-specific plugins and a data access server engine supports incorporating new client application data exchange protocols by means of plugins designed to interface with the data access server engine according to the standard interface definitions.

47 Claims, 7 Drawing Sheets

U.S. PATENT DOCUMENTS

| | | | |
|---|---|---|---|
| 6,049,819 A | 4/2000 | Buckle et al. | |
| 6,091,811 A | 7/2000 | Chang et al. | |
| 6,154,778 A | 11/2000 | Koistinen et al. | |
| 6,192,364 B1 | 2/2001 | Baclawski | |
| 6,263,330 B1* | 7/2001 | Bessette | 707/4 |
| 6,430,598 B1* | 8/2002 | Dorrance et al. | 709/203 |
| 6,480,597 B1* | 11/2002 | Kult et al. | 379/242 |
| 6,480,901 B1* | 11/2002 | Weber et al. | 709/246 |
| 6,498,835 B1* | 12/2002 | Skladman et al. | 379/88.12 |
| 6,601,094 B1* | 7/2003 | Mentze et al. | 709/220 |
| 6,718,550 B1* | 4/2004 | Lim et al. | 710/310 |
| 2001/0025321 A1* | 9/2001 | Tang et al. | 709/246 |

OTHER PUBLICATIONS

International Search Report in corresponding PCT Application No. PCT/US01/28949, dated Dec. 14, 2001.

International Search Report in corresponding PCT Application No. PCT/US01/28951, dated Dec. 31, 2001.

Newkerk, et al., "The common agent-a multiprotocol management agent," Digital Equipment Corp., Bellevue, Wa (Dec 1993), vol. 11, Issue: 9, pp. 1346-1352.

Supplementary European Search Report dated Sep. 7, 2009 for Ep 01 97 3071.

* cited by examiner

Add a new Client Protocol Plugin to a Data Access Server

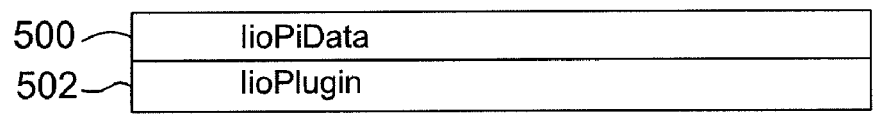
FIG. 8 (Plugin Interfaces)
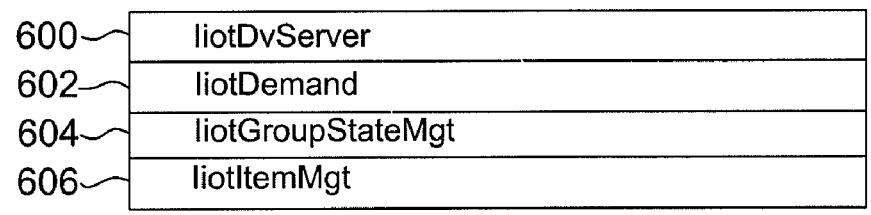
FIG. 9 (DAS Engine Interfaces)

INDUSTRIAL PROCESS CONTROL DATA ACCESS SERVER SUPPORTING MULTIPLE CLIENT DATA EXCHANGE PROTOCOLS

CROSS REFERENCE TO RELATED APPLICATION

This application claims priority of Todorov et al. U.S. provisional application Serial No. 60/232,731 filed on Sep. 15, 2000, entitled "Remote Multiple Client Protocol Support," the contents of which are expressly incorporated herein by reference in their entirety including the contents and teachings of any references contained therein.

FIELD OF THE INVENTION

The present invention generally relates to the field of computerized process control networks. More particularly, the present invention relates to data access server systems providing access by supervisory level client applications to process control information.

BACKGROUND OF THE INVENTION

Significant advances in industrial process control technology have vastly improved all aspects of factory and plant operation. Before the introduction of today's modem industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables, execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Data access servers facilitate placing process control data within reach of a variety of higher-level monitoring/control client applications. During the course of operation, process controllers generate status and control information concerning associated processes. The controllers' process status and control information is stored within process control databases and/or distributed to a number of locations within the process control network. Other process information is generated/stored within field devices (e.g., intelligent transmitters) having digital data communication capabilities. The process information is retrieved from the databases and field devices by data servers for further processing/use by the process control system. For example, the data access servers provide the retrieved information to a variety of client applications providing high-level control and monitoring (both human and computerized) services.

Proper operation of the high-level control and monitoring applications relies upon proper data interfaces between the process control/field device levels of a process control system and the higher-level supervisory/monitoring levels. The raw data at the control/field device levels of a process control system is stored in a variety of formats depending upon standards incorporated into the process control systems. Likewise, the client applications associated with, for example, the supervisory and monitoring level of a process control system potentially receive data from the data access servers according to any one (or more) of multiple existing (and future) application data interface protocols.

There are presently many different supervisory-level client applications that rely upon data provided by lower level components of a process control system. The supervisory-level client applications access/share the process data via known industry standard protocols such as dynamic data exchange (DDE), SuiteLink (transport protocol of WonderWare Corporation, 100 Technology Dr., Irvine, Calif.), and OPC (OLE for Process Control). The known supervisory level client applications not only encapsulate the logic/processes involved in extracting the process data from field devices, but also the implementation of the client communication for retrieving/receiving the data. This relatively static, limiting approach to client application implementation leads to duplication/replication of effort (a distinct version of client application for extracting device data is created for each communication standard that may be used to retrieve that data). This approach also creates an inability of data access server developers to leverage prior server versions. Users were slow in migrating from existing client applications to new client applications incorporating more effective protocols developed over the years due to incompatibilities with existing data provider communication protocols.

In view of the limitations of known data access servers, especially with regard to extensibility to provide data according to new, or previously unsupported, client application data access protocols, a more easily extended/modified data access server is desired.

SUMMARY OF THE INVENTION

The present invention offers a new degree of extensibility to client application interfaces in a process control system. Enhanced extensibility/flexibility is achieved in a data access server by decoupling data access server engine functionality from the client data exchange protocols used by client applications to request data from a data access server. The present invention achieves such decoupling by abstracting client application data communication protocols in a set of user installable/selectable/replaceable program modules such as, for example plugins. These program modules are installed on the data access server to facilitate presentation of data to the client applications according to a variety of protocols utilized by the client applications. After installation, the program modules provide a protocol-specific interface to client applications and communicate with the data access server engine via standardized universal set of interfaces. Thus, extension of a data access server incorporating the present invention is accomplished by providing and installing a new data exchange protocol module on the data access server. Previously existing software on the data access server, including the data access server engine and the previously installed protocol-specific protocol modules, need not be modified to include the new data exchange protocol module in the data access server system.

The present invention is directed to an extensible architecture for a data access server. The extensible architecture facilitates extending the set of client application data exchange protocols supported by the data access server—even a substantial period of time after installing the data access server. In particular, the present invention comprises a data access server that includes a set of components that are separately programmed and installable, yet run as an integrated system. The integrated components include a set of client data exchange protocol modules that provide data exchange protocol-specific interfaces between the data access server and client applications. The data access server also includes a data access server engine that executes a set of core functions. The core functions execute (i.e., process and respond to) client application requests for data supplied by a process control system. Communication between the set of client data exchange protocol modules and the data access server engine is carried out according to a standardized set of interfaces. The standardized set of interfaces provides an abstraction layer between the client data exchange protocols and the engine functions that acquire and provide process data to requesting client applications. The abstraction layer insulates the data access server from changes to client data exchange protocols supported by the data access server. Conversely, the DAS engine can be modified/replaced without impact upon the client protocol modules—assuming that the previous abstraction layer/interface is supported by any changes to the DAS engine or the DAS engine's replacement.

The present invention also comprises a unique set of steps/stages carried out by a data access server to provide process control system data to client applications via an extensible, multi-client data exchange protocol interface. The method includes intermediate steps performed at the abstraction layer by client protocol-specific modules and the data access server engine. The client-specific modules supply requests to the data access server engine according to an abstraction layer interface specification, the data access server engine acquires the requested information from the process control system, and the data access server engine generates responses to the client data exchange protocol modules via the abstraction layer interface specification.

A benefit of the process data server embodying the present invention is extensibility. The process data server supports incorporating additional protocols in support of new client applications, and continues to support existing data sharing/passing protocols associated with legacy clients, after the process data server is deployed on a process control network. A vendor of a process data access server incorporating the present invention can now deploy a reusable, extensible, optimized (e.g., only install needed protocols) process data access server to communicate to the data source.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 8 summarizes a set of interfaces implemented by data exchange protocol plugins; and FIG. 9 summarizes a set of interfaces implemented by a data access server engine.

DETAILED DESCRIPTION OF AN ILLUSTRATIVE EMBODIMENT

As mentioned previously herein, the exemplary data access server architecture is extensible with regard to incorporating new client data exchange protocols (e.g., DDE/SuiteLink/OPC. The extensibility is realized by a data access server architecture that utilizes modularized program extensions, such as for example plugins. The modularized program extensions issue interface calls to a data access server engine that executes a set of operations corresponding to the interface calls. The modularized program extensions pass requests, received from client applications according to particular data exchange protocols, to the data access server engine using the interface calls. Each of the modularized extensions exist independently of other modularized program extensions. Each modularized program extension is functionally linked/linkable to the data access server engine at runtime (rather than needing to be programmed). The modular nature of the program/system data exchange protocol extensions as well as the extensible architecture of the data access server enable extending the set of client data exchange protocols supported by the data access server after the server is deployed in a process control system/network.

Figure 1:
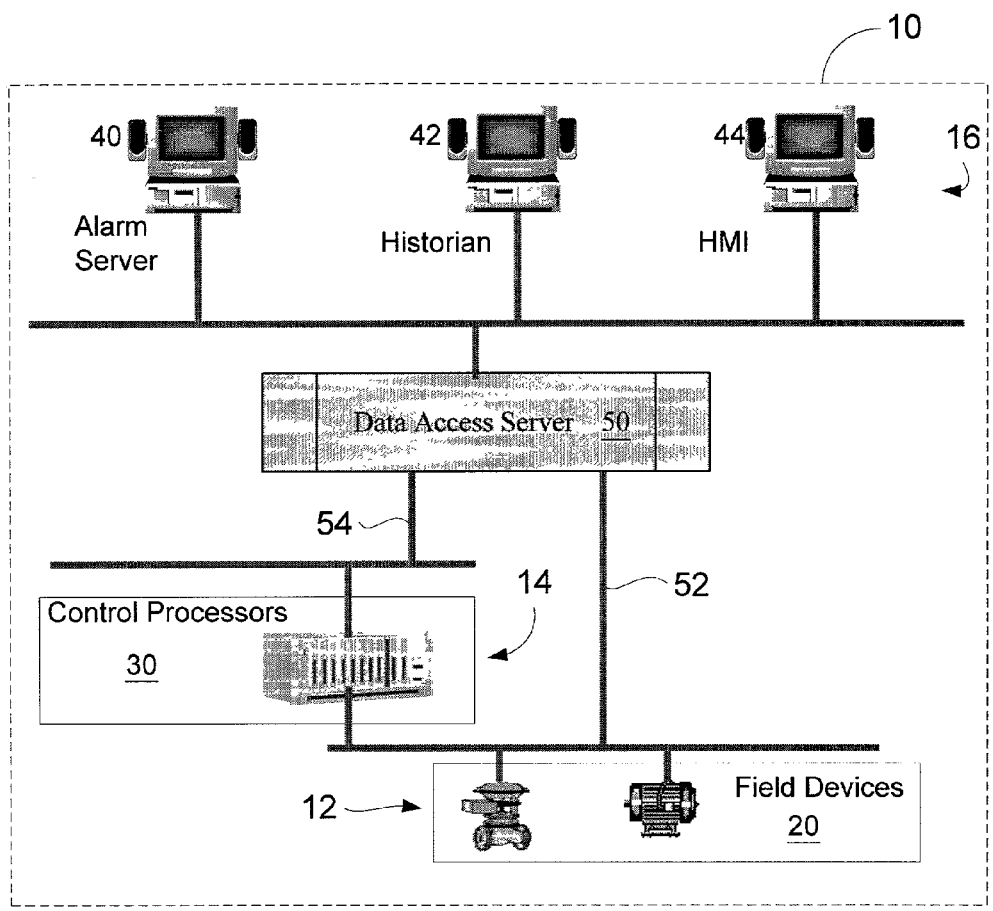
FIG. 1 is a schematic drawing depicting an exemplary process control environment for the present invention wherein a process data access server retrieves/receives process control information and provides such information to a variety of client applications residing at a monitoring/supervisory layer of a process control network.

Turning to FIG. 1, an exemplary portion of a process control network 10 is illustratively depicted. The process control network 10 can be viewed as a set of devices connected to one or more network links associated with particular levels of the process control network 10. In the exemplary embodiment, the depicted portion of the process control network 10 includes a fieldbus level 12, a local control level 14, and a supervisory control level 16. Though the exemplary embodiment is depicted as having three levels, those skilled in the art will readily appreciate the applicability of the present invention to a number of process control network architectures having more, less, or the same number of network levels. The illustratively depicted network 10 embodies a multi-level bus topology. However, the present invention can be incorporated into a process control network embodying an alternative network topology (e.g., a star network, a hybrid bus/star network, etc.).

In the exemplary portion of a process control network, a set of intelligent field devices 20 reside at the fieldbus level 12. The field devices include intelligent process variable transmitters that sense pressure, temperature, fluid flow, etc. in a controlled industrial process. The field devices also include actuators such as those enabling opening and closing fluid flow valves for tanks, burners, etc.

One or more control processors 30 at the local control level 14, perform local control functions with regard to the set of intelligent field devices 20. The control processors 30 receive process state information provided by the intelligent field devices 20. State information includes, for example pressure, temperature, mass flow, volumetric flow, etc. The control processors apply the received status information to a set desired points for the process, and then transmit control signals to actuators in order to obtain or maintain the desired set points. The control processors are programmed/configured to store the status and control information associated with their control function.

The supervisory control level 16 includes higher level control applications programs that facilitate and/or implement enterprise/plant level decision making and supervisory (e.g., set point) control value designation functions. An alarm server 40 receives process status data from a number of lower level sources, including both the control processors 30 and the field devices. The alarm server 40 compares the received status data against a set of alarm/event conditions and issues appropriate notifications to either monitors or control processes (e.g., control processors 30) in response to a detected alarm/event condition. The control processors 30 issue appropriate signals to controlled field devices/actuators to address the event/alarm condition. A historian 42, also operating at the supervisory control level 16, archives data received from any of the aforementioned levels of the process control system. Such data is available for auditing and verification by a variety of application programs. A human machine interface (HMI) 44 is yet another node connected to the supervisory control level 16. The human-machine interface 44 provides a set of graphic/text user interface functions enabling a human to view the operation/status of the controlled process associated with the process control system with which the depicted items of FIG. 1 are associated.

In an exemplary embodiment of the present invention, a data access server 50 is interposed between the supervisory control level 16's processing nodes and the lower levels of the process control system (e.g., the local control level 14 and fieldbus level 12). The data access server 50 receives and/or extracts data from the field devices 20 (via channel 52) and/or the control processors 30 (via channel 54) and provides corresponding (possibly reformatted) data to processing nodes at the supervisory control level 16 of the process control network 10. The data access server 50 performs the task of providing data to a variety of client applications that obtain data in accordance with particular data exchange protocols and are otherwise unable to access process control data provided at the local control level 14 and fieldbus level 12. Maintaining the ability of the data access server 50 to provide process control/manufacturing data to new supervisory-level client applications is potentially a non-trivial, costly task when the new client applications utilize newly developed data exchange protocols—or previously existing data exchange protocols that are not presently supported by the data access server 50.

However, the data access server 50 incorporating the present invention provides an extensible client interface architecture that invites expansion of the DAS 50 to support additional data exchange protocols even after the data access server 50 has been deployed in a process control network. Such additional protocol support is achieved through the incorporation of modularized program/system extensions (e.g., plugins) supporting particular data exchange protocols meeting the data access needs of new client applications added to the set of applications operating at the supervisory control level 16 of the network 10. In an exemplary embodiment of the invention (described herein below with reference to FIG. 3), a library within the data access server 50 activates the modularized program/system extensions. The activated extensions execute client application requests by accessing core data access server functions supported by a set of application interfaces executed by an engine within the data access server 50.

The process of installing a data exchange protocol extension module can occur at any time of the data access server 50's lifetime, including after the initial installation of the data access server 50. When upgrading to support additional data exchange protocols (e.g., a newer version of OPC) of new client application releases, there is no need to install a new version of the data access server 50. Instead a developer/maintainer of the previously installed data access server 50 software creates a new client protocol plugin supporting the new OPC data exchange protocol. The new OPC plugin is then added to existing data access servers that incorporate the extensible, plugin-based, data access server architecture.

Furthermore, it is noted that the present invention is not limited to any particular process control system network topology or technology. For example, the disclosed exemplary process control network comprises a hierarchically arranged digital system. However, in an alternative network embodiment the present invention is incorporated within a DAS connected to a single-level process control network wherein the field devices, control processor(s), and supervisory control applications constitute nodes on a single bus. In yet other cases, the DAS receives data concerning conventional, analog field devices that utilize the 4-20 milliamp standard for process communications.

Figure 2:
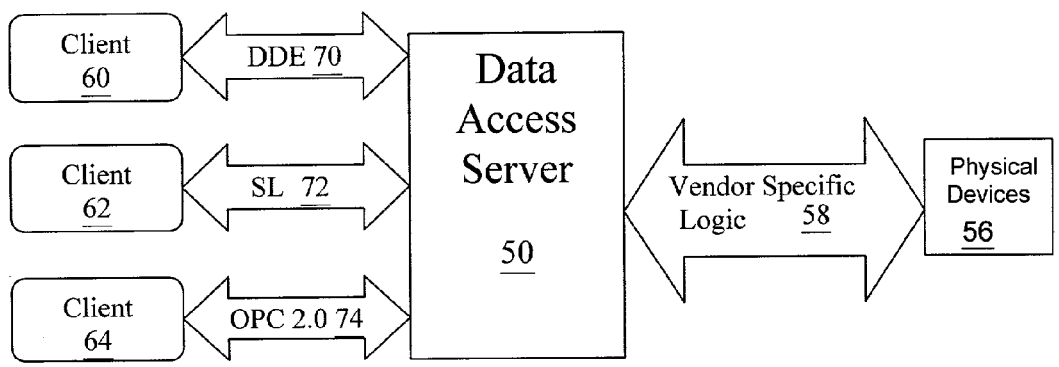
FIG. 2 is a schematic drawing summarizing the general interface arrangement for an exemplary data access server embodying the present invention.

Turning to FIG. 2, a general interface arrangement for the data access server 50 is schematically depicted. On the data source side, the data access server 50 obtains data from physical devices 56, such as the field devices 20 or process controllers 30, by means of vendor-specific data input logic 58. Examples of vendor-specific data access protocols incorporated into the vendor-specific data input logic are DF1 and Programmable Controller Communications Commands (PCCC) for Allen Bradley PLCs. The data access server 50 converts the obtained data into a generic format and stores the converted data within a database maintained by the data access server 50. In response to particular client requests, the data access server retrieves the data from the database and transmits the data in accordance with particular client application data exchange protocols associated with each of the different client data exchange protocols needed to transfer data to clients 60, 62, and 64. In an exemplary embodiment of the present invention, three protocol-specific plugins incorporated within the data access server 50 support providing process control data access via three different data exchange protocols (DDE, Suite Logic, and OPC) to clients 60, 62 and 64. The data exchange protocol-specific plugins incorporated within the DAS 50 render a DDE interface 70, SuiteLink interface 72 and OPC 2.0 interface 74 for data access by the clients 60, 62, and 64 respectively.

Figure 3:
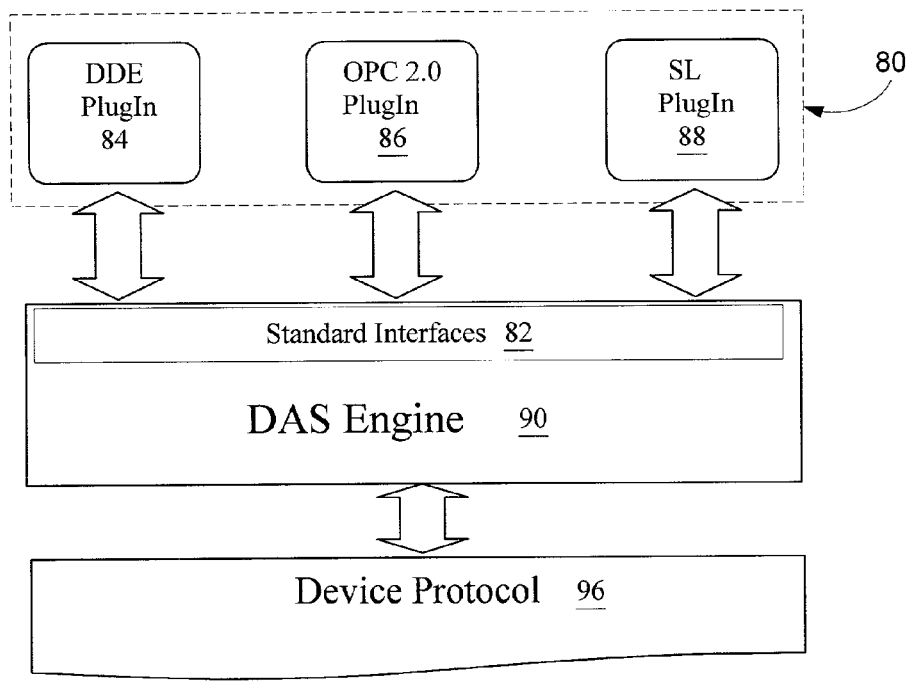
FIG. 3 is a schematic drawing depicting the software architecture of an exemplary data access server incorporating the present invention.

Turning to FIG. 3, the software architecture of a data access server incorporating the present invention is schematically depicted. As depicted in FIG. 3, the architecture of a data access server incorporating the present invention comprises, by way of example, three distinct functional components. A client data exchange component 80 is responsible for receiving client application requests and presenting responsive data to client applications according to particular supported data exchange protocols. A data access server (DAS) engine 90 component presents global data to the client protocol component 80 in accordance with previous requests from the client protocol component 80 initiated by client application requests. The DAS engine 90 also interfaces to a device protocol component 96. The device protocol component 96 is responsible for delivering data received from data sources such as field devices and control processors, to the DAS engine 90. The DAS engine 90 then passes the received data back to a particular protocol module of the client protocol component 80 or alternatively stores the received data in anticipation of later requests or updates requested by client applications and received by the DAS 50 via the client data exchange protocol component 80.

As mentioned herein above, the client data exchange protocol component 80 facilitates providing data to client applications according to specific data exchange protocols currently supported by the DAS 50. As depicted in FIG. 3, the client data exchange protocol component 80 incorporates a modular architecture. In particular, the client data exchange protocol component 80 comprises an extensible set of client data exchange protocol modules (e.g., plugins 84, 86 and 88) that support data exchange protocol-specific interaction between the DAS 50 and a set of client applications that communicate with the DAS 50 according to particular data exchange protocols. Such data exchange protocols include, by way of example, DDE, OPC 2.0, and SuiteLink. Each of these three data exchange protocols is handled respectively by DDE plugin 84, OPC 2.0 plugin 86 and SL plugin 88 that are installed, and are concurrently active, on the DAS 50.

The plugins 84, 86, and 88 interact with the DAS engine 90 via a set of standard interfaces (discussed herein below with reference to FIGS. 8 and 9) incorporated within the plugins 84, 86 and 88, and the DAS engine 90. A set of standard interfaces 82 (see, FIG. 9) comprise a superset of all interface operations potentially needed by any one of the plugins to enable the DAS engine 90 to respond to data requests received by the plugins from client applications executing at the supervisory control level of the process control system. The standardized interface between the plugins and the DAS engine 90 also facilitates replacing the DAS engine 90 without impacting the compatibility of the plugins with a replacement DAS engine 90.

The plugins of the data exchange protocol component 80, though adhering to a specified interface provided by the DAS engine 90, are created in a variety of ways. The plugins of the client data exchange protocol layer 80 can be written from scratch. However, in an embodiment of the invention the plugins are created from a toolkit including partially specified interface procedures for the plugins including calls to the standard interfaces incorporated within the DAS engine 90. Protocol-specific programming completes each of the plugins corresponding to particular data exchange protocols.

The protocol-specific plugins of the data exchange protocol component 80 enable the data access server 50 to provide data, received by the DAS 50 that originates from field devices and control processors in a process control system, to client applications according to data exchange languages, methods and requirements of specific data exchange protocols utilized by the client applications. Thus, the data exchange protocol component 80 facilitates establishing data exchange protocol-specific interfaces to client applications that utilize information provided by the process control system controllers and field devices. The client applications, in turn, utilize the received information to implement, by way of example, supervisory control of an industrial/manufacturing process.

Of course, the DAS 50 receives data requests and provides information to a particular client application only if the data exchange protocol component 80 supports the data exchange protocol utilized by the particular client application. In the illustrative embodiment of the present invention, such protocol-specific support is provided by a data exchange protocol plugin installed on the DAS 50 that interfaces to core functionality provided by the DAS engine 90 via the set of standard interfaces 82. Therefore, in the event that a new client application utilizes a data exchange protocol that is not presently supported by one of the plugins installed on the DAS 50, then a new plugin is installed at the data exchange protocol component 80. If a plugin does not currently exist for a particular data exchange protocol, then a new plugin is developed for the previously unsupported data exchange protocol.

The disclosed DAS architecture facilitates augmentation of the DAS 50 to incorporate a previously unsupported data exchange protocol utilized by a new client application with minimal, if any, impact on the existing DAS 50 programs. The new plugin is installed on the DAS 50 by a system administrator, using any of several well known installation procedures, without modifying existing DAS 50 programs. Expanding the DAS 50 capabilities to support new client application data exchange protocols, through installation of a new plugin, does not require redeployment of the DAS 50 software nor does it require re-writing portions of the existing DAS 50 software. Thus, the architecture of the DAS 50, and in particular the data exchange protocol component 80, depicted in FIG. 3 reduces the effort required to augment and/or update a current set of data exchange protocols supported by the DAS 50 deployed in a process control network/system.

Implementation of the DAS 50, in an embodiment of the invention, is based in-part on MICROSOFT Corporation's well known COM/DCOM technology. To cover as wide variety of client application data exchange protocols as possible, the data access server 50 supports both dynamic and static plugins. Dynamic plugins are a class of plugins that encapsulate client protocols (for instance OPC) wherein a server can be activated by a client application request (received by a dynamic plugin). Typically clients for such plugins activate a server (in this case the DAS 50) via a service control manager (SCM) and the lifetime of the activated server is determined by the client reference count. When the client reference count for the DAS reaches zero, the server shuts down or enters some form of inactive state (at least with regard to that particular plugin). Static plugins, on the other hand, are a class of plugins that are intended to communicate with clients that do not have server activation facilities (such as DDE and SuiteLink data exchange protocol client applications) and expect the data access server to be activated when the client attempts to connect and communicate with a data access server. Embodiments of the present invention include either/both static and dynamic plugins.

Figure 4:
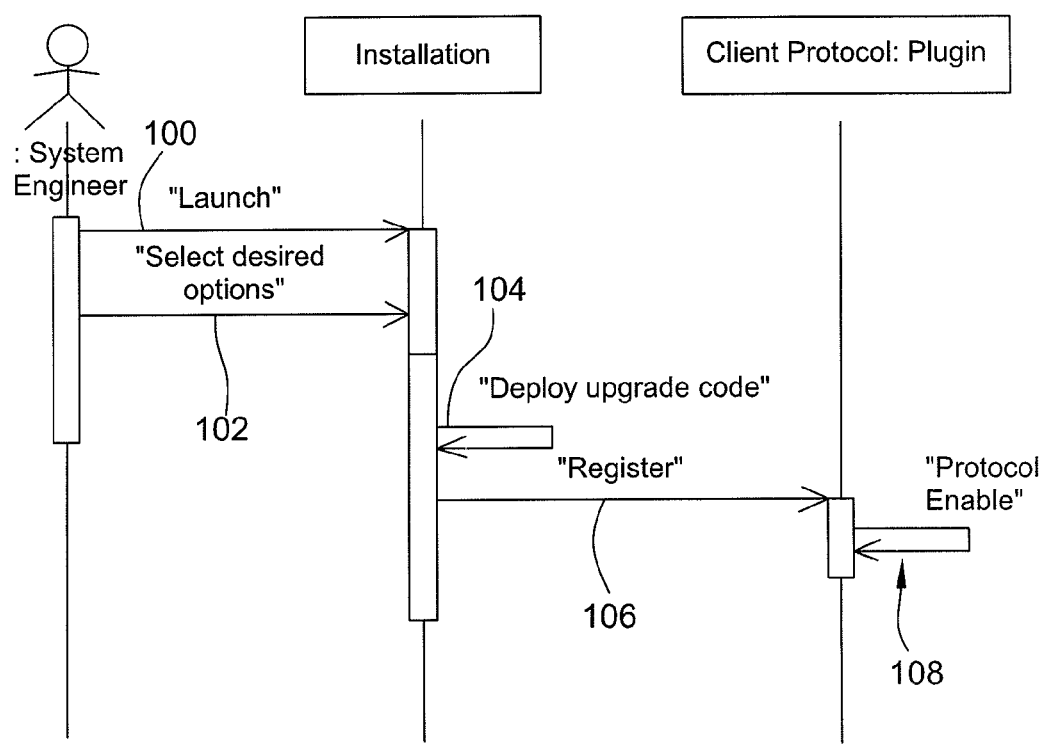
FIG. 4 is a sequence diagram summarizing an exemplary sequence of steps for incorporating a plugin into an existing data access server embodying the present invention.
Figure 5:
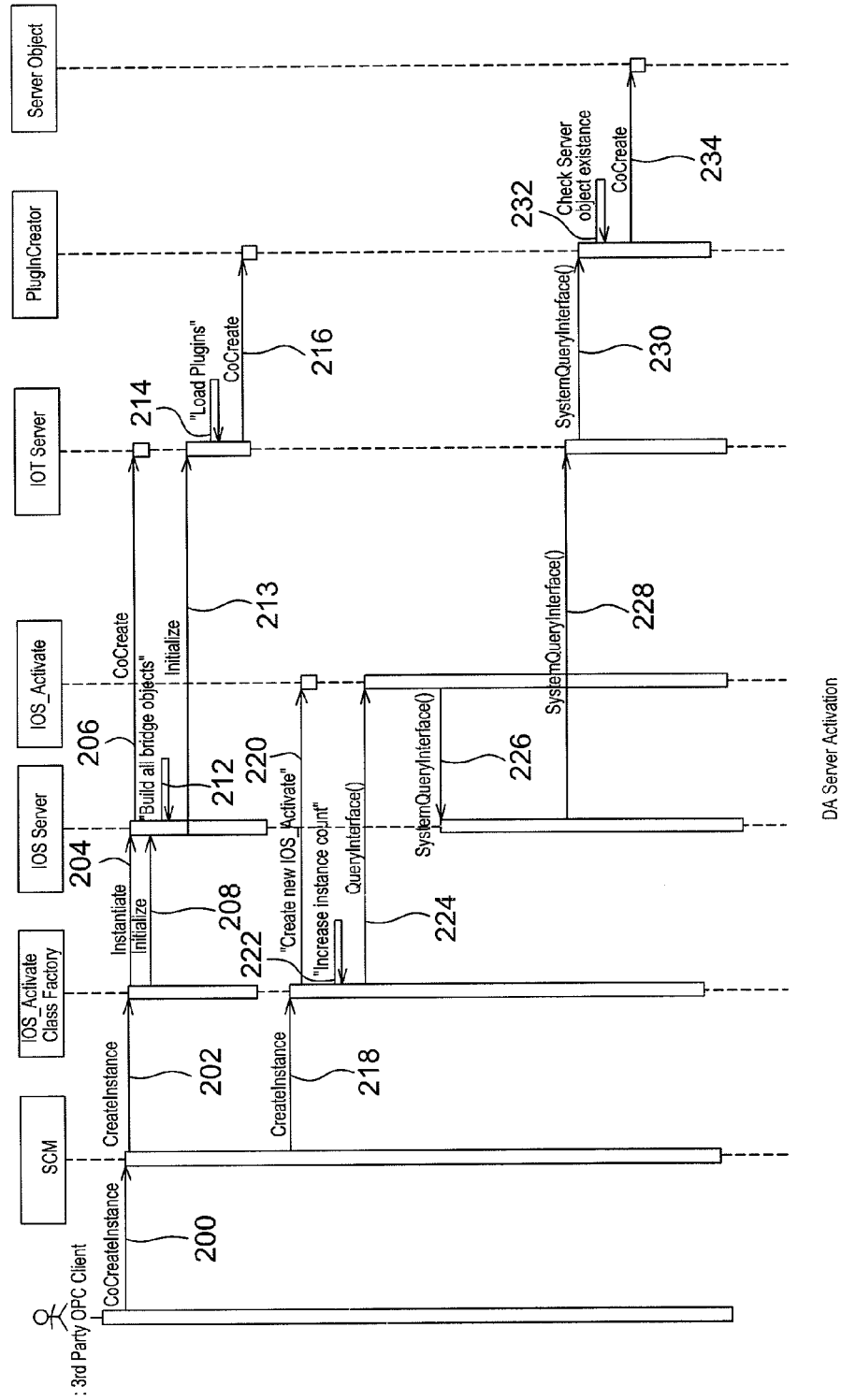
FIG. 5 is a sequence diagram summarizing an exemplary sequence of steps for starting up a data access server embodying the present invention.
Figure 6:
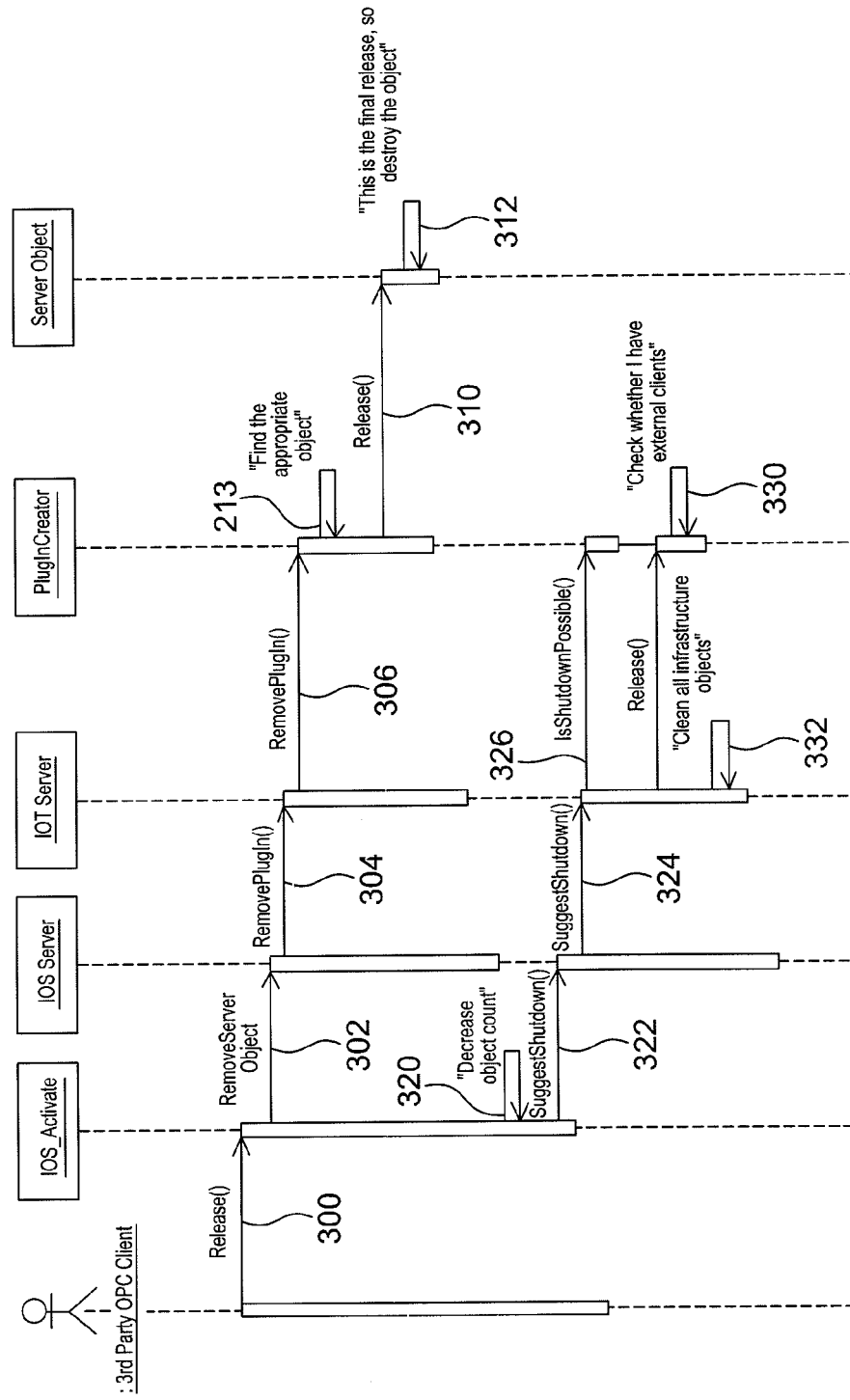
FIG. 6 is a sequence diagram summarizing an exemplary sequence of steps for shutting down a data access server embodying the present invention.

The extensible data exchange protocol interface of the disclosed data access server architecture facilitates independent development/modification of core components of a data access server, embodied in the DAS engine 90, and the development/incorporation of data exchange protocols embodied in protocol-specific plugins. If the need to support a new client application data exchange protocol arises after completing development of, and deploying, the data access server 50, then support for the new protocol is established by developing and installing a new protocol-specific plugin developed in accordance with the interface requirements of the set of standard interfaces 82. Thus, deployment of the data access server 50 is not held up by a need to establish support for new or presently unsupported data exchange protocols. FIG. 4, described herein below, depicts a sequence of events performed on the data access server 50 when a new data exchange protocol plugin is installed upon a network node executing the data access server 50. Thereafter, FIGS. 5 and 6 depict sequences of events, and the entities that perform them, during the activation and shutdown of a data access server embodying the disclosed extensible data access server architecture including client protocol extension modules in the form of plugins.

The DAS engine 90 logically organizes data received from devices to provide a standardized/generic data access interface to the plugins (e.g., DDE plugin 84) through the set of standard interfaces 82. As explained above, the plugins of the data exchange protocol component 80, in turn, provide client protocol-specific access to the received data. Thus, the DAS engine 90 remains relatively stable in relation to the data exchange protocol component 80 that is modified to accommodate previously non-supported data exchange protocols (without modifying the DAS engine 90).

Data activation, or the actual retrieval of stored data in response to a request specified by a particular client protocol plugin, is performed in a standardized manner (regardless of the requesting client's protocol) at the DAS engine 90. In an embodiment of the present invention, the client protocol-specific plugins receive a data request for an item of interest according to a particular data exchange protocol and convert the request into one or more calls to particular ones of the operations associated with the set of standard interfaces 82. The calls are handled by core data access functions within the DAS engine 90. The DAS engine 90 issues a corresponding request to a device protocol (or alternatively retrieves data that has already been provided by the device protocol). The device protocol, if needed, retrieves the requested data from data sources within the process control system (e.g., field devices and control processors). The DAS engine 90 returns data via standard interface plugin operation calls incorporated into the DAS engine-to-plugins interface (see, FIGS. 8 and 9).

The DAS engine 90 software manages groups, and items that the groups reference. In general, a group is a collection of items and possibly other groups (in a nesting arrangement) having similar requirements. An item represents/corresponds to a data source on the data access server 50. The DAS engine 90 also manages hierarchy levels of groups and items—with the lower level endpoints being a single physical item (e.g., an object in a data supplying device such as a programmable logic controller). The DAS engine 90 supports an n-to-1 relation of groups to a particular referenced item. Thus, the DAS engine 90 optimizes access to items such that if multiple (n) clients/groups access/reference a same data item, then the DAS engine 90 obtains the data item only once and then provides the data to the multiple (n) requesters—potentially according to multiple supported data exchange protocols. In a particular embodiment of the invention, the DAS engine 90 stores a retrieved data value as a physical item, and all clients (group items) referencing the data item use the properties of the stored physical item. Each physical item maintains/provides a current value, timestamp and quality (VTQ) for a corresponding data item. Each group item stores a value and quality for the last update the group item received of the referenced item. After retrieving particular requested data corresponding to a referenced physical item, the DAS engine 90 accesses one of the included data exchange protocol plugins in the data exchange protocol component 80 to render data for a referenced item to a client application according to a particular data exchange protocol.

The lowest level of the software architecture of the data access server 50 is the device protocol component (or "server specific part") 96. The device protocol component 96 implements hardware (and potentially database) protocols to deliver actual data from field devices 20 and control processors 30 to the DAS engine 90. The device protocol component 96 implements one or more distinct data extraction interface standards to obtain the process control information from a variety of field devices and control processors in a process control system/network environment.

Finally, though not specifically depicted in FIG. 3, the DAS 50 includes a library of support functions, including standard support functions associated with the COM/DCOM component of the WINDOWS operating system. These support functions facilitate the start-up and shut-down of the depicted components of the DAS 50 in FIG. 3. The operation of these support functions is described herein below with reference to the exemplary methods performed by the DAS 50.

Turning now to FIG. 4 a set of steps are depicted for adding a new client protocol to the data access server 50 by means of a plugin. The plugin itself includes one or more software modules (e.g., dll or exe files) that are copied onto a target server system during deployment. The DAS 50 is, for example, a compute node executing Wonderware's data access server software. In the present example, the plugin is packaged within a self-installed program/utility that is executable by an administrator. The augmentation process is handled at a high level and does not require human programming skills to complete. At stage 100, a system engineer launches an installation program of well-known design that, during stage 102, produces a window (or series of windows) presenting a set of customization options associated with the particular client protocol plugin. During stage 104, the plugin software module is deployed on the DAS 50 (as well as upon any other computing devices that execute the plugin software).

Next, during stage 106, a registration command is invoked to register the plugin software according to requirements of the particular operating environment/system upon which the plugin software is deployed. Such requirements, as will be appreciated by those skilled in the art, vary from system to system based upon the notification requirements of the different systems. In an exemplary embodiment of the present invention, the plugin is registered within a plugin repository. In the exemplary embodiment, the plugin repository is implemented in a MICROSOFT WINDOWS environment using a WINDOWS "Component Categories" mechanism. In WINDOWS environments, the Component Categories mechanism uses the WINDOWS Registry as the storage area for identifying registered protocol extension plugins. This registration arrangement enables grouping of logically related components to occur as well as enumeration of the registered components by the client applications that utilize the plugins. During a protocol enable stage 108 steps are executed to make the plugin-enhanced DAS 50 visible to the client applications that utilize the particular enabled client data exchange protocol. For example, in the case of an OPC client, the DAS 50 is registered in the OPC category of the WINDOWS Registry. Stage 108 establishes a link between a client application and a particular client access protocol embodied within a registered plugin. During the protocol enable stage 108, the DAS 50 activates the registered protocol plugin's capabilities to facilitate interacting with requesting clients according to a particular client protocol. Thereafter, the enabled plugin operates as a protocol interface between the process data stored by the DAS 50 and requesting clients that utilize the data transmission protocol embodied within the enabled plugin. While the WINDOWS Registry is utilized in the exemplary embodiment, the registration of a plugin or other extension module can occur via alternative registration repositories in alternative embodiments of the invention.

Having described how a client protocol plugin is added to an existing system, attention is directed to FIG. 5 and a summarized set of stages/steps depicting how the DAS 50 is activated/instantiated in association with, in this particular example, an OPC client request. In the particular example, the DAS 50 is activated dynamically using the MICROSOFT WINDOWS SCM utility in response to an initial client request. However, in alternative embodiments of the invention the DAS 50 and/or the client protocol specific plugins are statically activated before receiving any specific requests from a client application. During the initial startup process the DAS 50 is activated, and objects and data structures supporting connections between client data exchange protocol plugins of the data exchange protocol component 80, the DAS engine 90, and the are established. In particular, during activation the DAS engine 90, which hosts all plugins for a DAS 50, accesses the repository of installed plugins (e.g., within the WINDOWS Registry) and activates all installed client protocol plugins. During activation, the DAS Engine 90 performs a sequence of steps to activate each installed dynamically activated plugin in accordance with MICROSOFT's COM (component object model) based technology. Thus, from the point of view of the DAS 50's clients, the DAS 50 (and its activated protocol plugins) appears to client applications as a single entity that carries out a particular client protocol used by the particular clients. In actuality, the DAS 50 is a multi-component system with multiple client interface components (e.g., plugins) providing the DAS 50 the capability to expand its set of supported client protocol interface to provide data to multiple distinct clients practicing a variety of different data exchange protocols. It is emphasized that these steps are exemplary, and those skilled in the art will readily appreciate that the steps for starting up the DAS 50 and its installed plugins are modified in alternative embodiments of the invention.

During stage 200, an OPC client request (from any application interfacing to the DAS 50 via the OPC protocol) calls a "CoCreateInstance" WINDOWS API. The stages that follow create a fully functional data access server of the type represented in FIG. 3 including the set of client data exchange protocol plugins 84, 86 and 88, the DAS engine 90, and the device protocol component 96, as well as the structures that enable these components to pass requests and data between one another within the DAS 50. The CoCreateInstance API is called once to start a DA server executable. Since the single executable instance of the DA server, in a preferred embodiment of the invention, supports multiple client requests on multiple distinct connections (and potentially using different data exchange protocols) to the identified DA server, launching additional copies of the executable is both unnecessary and potentially reduces the performance of the DAS 50.

In response to the CoCreateInstance call, at stage 202 a system control manager (SCM) of the WINDOWS operating system issues a "CreatInstance" WINDOWS API call to create an IOS_Activate_Class_Factory object instance. Next, during stage 204, the IOS_ActivateClassFactory creates an IOS_Server object. This occurs only once (during the initial startup of the DAS). The IOS_Server object is a logical entity created from a device protocol-specific DLL written for a particular device protocol component 96 behavior. The IOS_Server object supports interaction between the DAS engine 90 and the device protocol component 96 of the DAS 50. After the IOS_Server object has been created during stage 204, at stage 206 the IOS_Server object invokes creation of an IOT_Server object. The IOT_Server object, rendered from a standard DAS engine DLL, establishes connections supporting interaction between the DAS engine 90 and the data exchange protocol component 80—comprising plugins corresponding to particular data exchange protocols (e.g., OPC)—and the device protocol component 96 of the DAS 50.

During stage 208, IOS_ActivateClassFactory initializes the IOS_Server object instance created during stage 204. Initialization during stage 208 comprises passing information enabling the DAS engine 90 and the device protocol component 96 to communicate. During stage 210 IOS_Server builds bridge objects modifying the default behavior (group of objects and functionality exposed) of the DAS engine 90 according to specifications supplied by the device protocol component 96. At stages 212 and 213 the IOS_Server object and IOT_Server object cross-initialize the bridge objects so that both the IOS_Server object and the IOT_Server are able to reference the bridge objects.

During stage 214, the IOT_Server identifies all plugins installed upon the machine running the DAS 50. After identifying the plugins during stage 214, during stage 216 IOT_Server object invokes a CoCreateInstance API specifying a plugin (e.g., the OPC plugin). The API call results in the instantiation of a PluginCreator object corresponding to the specified (e.g., OPC) plugin. Stages 214 and 216 are repeated for all plugins. Upon completion of stages 214 and 216 (possibly multiple repetitions for multiple supported client data exchange protocols), the DAS 90 is ready to process requests from client applications—including a first client request that resulted in the execution of stages 200 to 216.

The remaining stages of FIG. 5 concerns the creation of a logical data access (DA) server object for a particular client connection. These remaining stages are only utilized for COM-based clients (e.g., OPC). In the case of non-COM clients, the plugin for the particular data exchange protocol handles the creation of a server object for the client connection. During stage 218 the SCM invokes the CreateInstance operation on the IOS_Activate_ClassFactory Object to initiate creation of the logical DA server object corresponding to a specific client-server connection. During stage 220 the IOS_Activate_ClassFactory object for the DAS 50 creates an IOS_Activate object to establish an identity for the logical DA server object instance created to service the new client application/DA server connection. During stage 222, the IOS_Activate_ClassFactory object increases the instance count for the DA server from zero to one. The instance count references the number of current users of the DA server. When the instance count reaches zero, the DA server instance is removed.

Thereafter, a set of calls during stages 224, 226, 228, and 230 propagate a call to create a new logical DA server object for a particular client connection. During stage 224 IOS_Activate_Class_Factory invokes the QueryInterface method on the IOS_Activate object designating an identification for the interface (logical DA server instance). During stage 226 IOS_Activate invokes the SystemQueryInterface method upon IOS_Server object with the identified interface. During stages 228 and 230 the IOS_server object passes the interface identification to the IOT_Server object, and the IOT_Server object passes the interface identification to the PlugInCreator, as the request to establish a particular logical interface between a client application and the DAS 50 is propagated to create a logical DA server object.

At stage 232 the PlugInCreator looks for the identified DA server object instance in a set of existing DA server object instances. If the DA server object instance is present, then the request from the COM-based client (e.g., OPC) is delegated to the DA server object. Otherwise, during stage 234 the logical DA server object instance is created for the particular client connection.

Referring now to FIG. 6, an exemplary set of stages are depicted for shutting down the DAS 50 when the last of a set of logical DA server object instances is released by a client application. It is noted that the example before is for a COM-based (e.g., OTC) plugin connection. In the case of non-COM plugins, the shutdown is handled by the plugins themselves. Since there are potentially multiple plugins and multiple clients connected simultaneously to the DAS 50, in an orderly shut down the DAS 50 ensures that all connected clients are disconnected prior to shutting itself down. The stages depicted in FIG. 6 depict an exemplary method for performing an orderly shutdown via execution of a handshaking procedure for each connected clients. During stage 300 a client application closes a connection to the DAS 50—the last of such connections presently served by the DAS 50—with a call to the corresponding IOS_Activate object. In response during stage 302 the IOS_Activate object associated with the client connection initiates removing the DA server object associated with the connection. During stages 304 and 306, the removal of objects and the clean up procedure cascades through the IOS_server and IOT_server created during the steps summarized in FIG. 5, to the PlugInCreator. During step 308, the PlugInCreator finds the object associated with the data exchange protocol associated with the disconnected client. During step 310 the PlugInCreator invokes a release method upon the DA server object corresponding to the client connection, and during stage 312 the DA server object is destroyed.

As explained herein above, when all connections are closed, then the DAS 50 itself shuts down. During step 320, the object count for connections is reduced by one. Assuming the current connection is the last connection for the DAS 50, the object count reaches zero—i.e., there are no more connections. During stage 322 the IOS_Activate object invokes a suggestsshutdown method on the IOS_server object. The IOS_server passes the call onto the IOT_server object. The IOT_server passes the shutdown request in the form of a sShutdownPossible method call to the PlugInCreator object. If shutdown is indeed possible, then at stage 328 the IOT_server object invokes the release method on the PlugIn center. The PlugIn center then shuts down the plugin for the particular data exchange protocol used by the client for the extinguished connection. Finally, during stage 332 the IOT_server cleans temporary structures created to support the DAS 50 and its integrated client and device interface protocol components.

Figure 7:
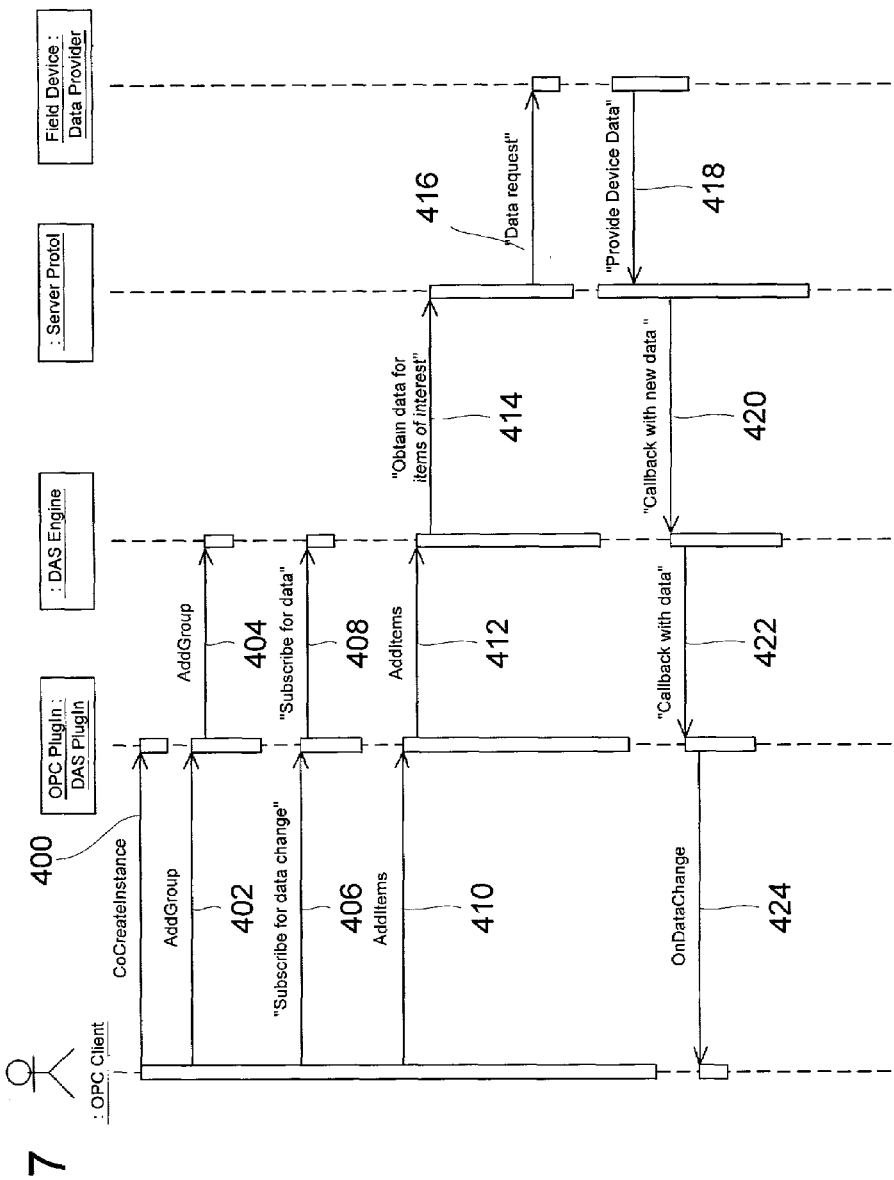
FIG. 7 is a sequence diagram summarizing an exemplary sequence of steps performed by a data access server to respond to client application request for process data from a particular data source in a process control system according to a particular data exchange protocol.

Turning now to FIG. 7, an exemplary set of steps are summarized for the DAS 50 responding to a client application request. Again, the request is a COM-based (e.g., OPC) client application. However, non-COM-based client applications are contemplated within the scope of the present invention. The process steps may differ for non-COM applications. During stage 400, the OPC client issues a request that invokes all or part of the steps depicted in FIG. 5 (depending upon whether this is a first client connection for the DAS 50) to create a DA server object for the connection. Once activated, the requests are received by the DAS 50, from client applications, via the plugins. The requests are then passed from the appropriate plugins to the DAS engine 90 via standard interface operation calls described herein below with reference to FIG. 9. After the DAS 50 has set up appropriate DA server object structures to support the connection to the client, at stage 402 the client invokes an AddGroup function on the plugin to establish a container in which to deposit/access process control data requested by the client. During stage 404 the AddGroup request is propagated via the standard interface operation "AddGroup" to the DAS engine 90 by the plugin (e.g. OPC plugin 86). During stage 406 the client application requests a subscription service for changes to the data identified in the added group, and the subscription request is propagated to the DAS engine 90 during stage 408. Next, during stage 410 the client application requests the plugin to add particular data items (e.g., a pressure sensor reading) to the group added during stage 402. The plugin propagates the request to the DAS engine 90 during stage 412.

Thereafter, the DAS engine 90 obtains the requested data via requests to the device protocol component 96 during stage 414. During stage 416 the device protocol component 96 carries out the request to obtain the data using a device specific protocol to request data from field device data providers (including control processors). The device data corresponding to the requested data items are provided to the device protocol component by the field device data provider during stage 418. During stage 420, the device protocol component 96 returns the device data back to the DAS engine 90. Next, at stage 422 the DAS engine 90 provides the device data to the appropriate plugin. The plugin performs any data change filtering required to eliminate unchanged data and then forwards the changed data at stage 424.

It is noted that with regard to the sequence of stages/steps depicted in FIG. 7, the steps on the left side of the DAS (OPC) plugin vertical line are performed according to a client application data exchange protocol (e.g., OPC 2.0). The client application protocol-specific plugin (e.g., OPC plugin 86) communicates with the client according to a particular data exchange protocol. The steps on the right side of DAS plugin vertical line are performed according to a set of interfaces (operations) universally defined for all plugins and the DAS engine 90—see FIGS. 8 and 9 described herein below. Thus, the DAS plugin acts as a protocol converter between particular client application protocols and the DAS engine 90.

Having described an exemplary data access server architecture embodying the present invention, the following observations are made about the server's modular client protocol interface architecture. First, device specific data encoding is decoupled from client application data exchange protocols. Therefore, development of these two distinct aspects of the data access server are autonomous. Second, special client application protocol configuration is not needed for interfacing the data access server 50 to client applications that adopt one of the plugin-supported data exchange protocols. Assuming a plugin for a particular data exchange protocol exists, the plugin is obtained and installed in a routine manner by a system administrator. There is no need to upgrade the core functionality of the DAS—that remains unchanged. Third, support is provided for 'dynamic' plugins (for COM based clients) and 'static' plugins (for non COM based clients). The static plugins will not activate the DAS (i.e., the DAS must be started independently of the plugins). In instances where static plugins are present, a DAS control client is provided to enable users to start the DAS prior to invoking the static plugin to handle a client data request. The dynamic plugins activate the relevant server software, and when the client reference count for the server reaches zero the server shuts down. Fourth, the present invention enables leveraging (i.e., providing a ready platform) existing data access servers incorporating the server library for plugins added after initial installation of a data access server for interfacing to new client applications via new data exchange protocols.

In an embodiment of the invention, when a plugin is developed the plugin is an in-process component (e.g., a dynamically linked library (DLL)). However, in an alternative embodiment of the invention the plugin is developed as an out-of-process (e.g., *.exe) component of the data access server 50. With regard to threading, the DAS engine 90 is developed as a multi-threaded apartment (MTA). If MTA is utilized, then proxy/stub pairs (that slow performance) are avoided. For plugins that encapsulate COM based protocols the plugins are MTAs to ensure the COM rule for IUnknown identity (part of the MICROSOFT COM specification) is followed. Thus, every time a COM object is a requester, it returns the same interface to provide its IUnknown interface. This requirement is not required for other interfaces. With regard to granularity, the data exchange protocol plugins handle a broad spectrum of data retrieval-related objects including server and group objects. Server objects expose global server services. Servers are also specified as containers for group objects that reference other group objects or specific data items.

In an embodiment of the present invention, the interfaces between plugins and the DAS engine 90 are based upon COM interfaces. The structure and content of interface operations executed by the plugins and called by the DAS engine 90, identified in FIG. 8, are described herein below. The operations called by the DAS engine 90 and carried out by the various installed plugins enable the DAS engine 90 to communicate process data to client applications via the plugins. While a basic set of interface operations and their associated operations are identified and described herein below, it will be understood by those skilled in the art that alternative embodiments of the invention include differing interface operations and specifications.

The DAS engine 90 to plugin interfaces are described in the following manner. First, an interface "declaration" identifies a set of operations associated with the interface. Next, operations identified in the declaration section are individually described under a subsection identified by an "operations" heading. The operations performed by the plugins are described with reference to exemplary passed parameters and a summary of the general function performed by the plugins.

An IioPiData interface 500 includes a set of operations, called by the DAS engine 90 and executed within plugins, concerning notifications (including data) from the DAS engine 90 to a data exchange protocol plugin in association with reading data from, and writing data to, a process data source managed/monitored by the DAS engine 90 such that process data is accessible by the DAS engine 90 via the device protocol 96. The following is an exemplary declaration/summary for the IioPiData interface 500.

Declaration
```
[
    object,
    uuid(7AA39773-AC55-11D2-8203-00A024A866AC),
    helpstring ("IioPiData Interface"),
    pointer_default (unique)
]
```

-continued

```
interface IioPiData : IUnknown
{
    HRESULT OnData (
        [in] PIHANDLE hGroup,
        [in] DWORD dwCount,
        [in, size_is (dwCount)] PIHANDLE * phPlugInItems,
        [in, size_is (dwCount)] VARIANT * pvValues,
        [in, size_is (dwCount)] WORD * pwQualities,
        [in, size_is (dwCount)] FILETIME * pftTimeStamps,
        [in, size_is (dwCount)] HRESULT *pErrors,
        [out] UPDATECODE * updatecode
    );
    HRESULT OnReadComplete(
        [in] DWORD dwCount,
        [in, size_is (dwCount)] PIHANDLE * phPlugInItems,
        [in, size_is (dwCount)] VARIANT * pvValues,
        [in, size_is (dwCount)] WORD * pwQualities,
        [in, size_is (dwCount)] FILETIME * pftTimeStamps,
        [in, size_is (dwcount)] HRESULT *pErrors,
        [in) CTTRANSACTIONDEF TransactionDef
    );
    HRESULT OnWriteComplete(
        [in] DWORD dwCount,
        [in, size_is (dwCount)] PIHANDLE * phPlugInItems,
        [in, size_is (dwCount)] HRESULT * pErrors,
        [in] CTTRANSACTIONDEF TransactionDef
    );
}
```

The following is a description of exemplary operations for carrying out the IioPiData interface 500 in a data exchange protocol-specific plugin.

Operations

OnData

| Declaration |
|---|
| HRESULT OnData (<br>    [in] PIHANDLE hGroup,<br>    [in] DWORD dwCount,<br>    [in, size_is (dwCount)] PIHANDLE * phPlugInItems,<br>    [in, size_is (dwCount)] VARIANT * pvValues,<br>    [in, size_is (dwCount)] WORD * pwQualities,<br>    [in, size_is (dwCount)] FILETIME * pftTimeStamps,<br>    [in, size_is (dwCount)] HRESULT *pErrors,<br>    [out] UPDATECODE * updatecode<br>) |

| Parameter Descriptions for the OnData operation. | |
|---|---|
| Hgroup | A Handle identifying the group these items belong to, as supplied by the PlugIn. |
| DwCount | Size of the arrays being passed. This is the number of items whose VTQ is being reported for this scan. |
| phPlugInItems | An array of dwCount handles. These handles were supplied by the PlugIn, and identify the items whose VTQs are being reported.<br>NOTE: It is the responsibility of the PlugIn to dispose of the memory holding the array, when done with it. |
| PvValues | An array of dwCount variant values. These are the values being reported for the items.<br>NOTE: It is the responsibility of the PlugIn to dispose of the memory holding the array, when done with it. |
| pwQualities | An array of dwCount DWORDs. These are the qualities being reported for the items.<br>NOTE: It is the responsibility of the PlugIn to dispose of the memory holding the array, when done with it. |

| Parameter Descriptions for the OnData operation. | |
| --- | --- |
| pftTimeStamps | An array of dwCount FILETIME structures. These are the times being reported for the items.<br>NOTE: It is the responsibility of the PlugIn to dispose of the memory holding the array, when done with it. |
| Perrors | An array of HRESULTs. These are the individual error codes for each item being reported. Bit 15 (0x00008000) can be used by the PlugIn to check for primefirst updates. Before passing pError values to OPC clients mask with ~0x00008000 first.<br>NOTE: It is the responsibility of the PlugIn to dispose of the memory holding the array, when done with it. |

Remarks:

For active items, when the server-specific protocol engine (at the device protocol layer 96 of the DAS 50) determines that an item has a new value, it is added to a list. At the end of a protocol cycle (as determined by the protocol engine), the list of new item VTQs is sent by the DAS engine 90 to a particular date exchange protocol plugin using this method. Determination of an actual change of value is made by the DAS Engine 90. Only those items which have received new update values are put on the list.

OnReadComplete

| Declaration |
| --- |
| HRESULT OnReadComplete (<br>    [in] DWORD dwCount,<br>    [in, size_is (dwCount)] PIHANDLE * phPlug.InItems,<br>    [in, size_is (dwCount)] VARIANT * pvValues,<br>    [in, size_is (dwcount)] WORD * pwQualities,<br>    [in, size_is (dwCount)] FILETIME * pftTimeStamps,<br>    [in, size_is (dwCount)] HRESULT *pErrors,<br>    [in] CTTRANSACTIONDEF TransactionDef |

| Parameter Descriptions for the OnReadComplete operation: | |
| --- | --- |
| DwCount | Size of the arrays being passed. This is the number of items whose demand read is complete, and are reporting VTQ. |
| phPlugInItems | An array of dwCount handles. These handles were supplied by the PlugIn, and identify the items whose VTQs are being reported.<br>NOTE: It is the responsibility of the PlugIn to dispose of the memory holding the array, when done with it. |
| PvValues | An array of dwCount variant values. These are the values being reported for the items.<br>NOTE: It is the responsibility of the PlugIn to dispose of the memory holding the array, when done with it. |
| pwQualities | An array of dwCount DWORDs. These are the qualities being reported for the items.<br>NOTE: It is the responsibility of the PlugIn to dispose of the memory holding the array, when done with it. |
| pftTimeStamps | An array of dwCount FILETIME structures. These are the times being reported for the items.<br>NOTE: It is the responsibility of the PlugIn to dispose of the memory holding the array, when done with it. |
| PErrors | An array of HRESULTs. These are the individual error codes for each item being reported.<br>NOTE: It is the responsibility of the PlugIn to dispose of the memory holding the array, when done with it. |
| TransactionDef | Transaction ID definition. This demand read is complete, and was started by the PlugIn using IIotDemand::ReadDevice() . At that time, the PlugIn supplied a transaction definition, and allowed the read to proceed asynchronously.<br>NOTE: It is the responsibility of the PlugIn to dispose of the memory holding the array, when done with it. |

Remarks

For a list of items on demand read, the values may be reported by the DAS engine 90 to a requesting plugin in an out-of-band manner using this method. The OnReadComplete method works in much the same way as the OnData method works for active items.

OnWriteComplete

| Declaration |
| --- |
| HRESULT OnWriteComplete(<br>    [in] DWORD dwCount,<br>    [in, size_is (dwCount)] PIHANDLE * phPlugInItems,<br>    [in, size_is (dwCount)] HRESULT * pErrors,<br>    [in] CTTRANSACTIONDEF TransactionDef<br>) |

| Parameter Descriptions for the On WriteComplete operation: | |
| --- | --- |
| DwCount | Size of the arrays being passed. This is the number of items whose write is complete, and are reporting the event. |
| PhPlugInItems | An array of dwCount handles. These handles were supplied by the PlugIn, and identify the items whose VTQs are being reported.<br>NOTE: It is the responsibility of the PlugIn to dispose of the memory holding the array, when done with it. |
| Perrors | An array of HRESULTs. These are the individual error codes for each item being reported.<br>NOTE: It is the responsibility of the PlugIn to dispose of the memory holding the array, when done with it. |
| TransactionDef | Transaction definition. This demand write is complete, and was started by the PlugIn using IIotDemand::WriteDevice(). At that time, the PlugIn supplied a transaction definition, and allowed the write to proceed asynchronously.<br>NOTE: It is the responsibility of the PlugIn to dispose of the memory holding the array, when done with it. |

Remarks

For a list of items being written by the DAS engine 90, the write complete event is reported to a particular data exchange protocol plugin using this method. The OnWriteComplete method works in much the same way as OnReadComplete does for demand read items, except no VTQ is required for written data.

With continued reference again to FIG. 8, an IioPlugIn interface 502 is the primary interface exposed by each plugin to the DAS engine layer 90. The IioPlugIn interface 502 facilitates general manipulation of a plugin by the DAS engine layer 90. The following summarizes the content of an exemplary implementation of the IioPlugIn interface 502.

```
Declaration
[
    object,
    uuid (7AA3977A-AC55-11D2-8203-00A024A866AC),
    helpstring ("IIoPlugIn Interface"),
    pointer_default (unique)
]
interface IIoPlugIn : IUnknown
{
    HRESULT Init (
        [in] IIotDbServer* pIotDbServer,
        [out] DWORD* nNumInterfaces
    );
    HRESULT GetIEnumGUID(
        [in]            REFIID          riid,
        [out, iid_is (riid)] LPUNKNOWN * ppUnk
    );
    HRESULT Shutdown ( );
    HRESULT IsShutdownpossible ([out] BOOL *bShutdown);
}
```

The following is a description of exemplary operations for carrying out the IioPlugin interface 502.

Operations

GetIEnumGUID

| Declaration |
|---|
| HRESULT GetIEnumGUID ( <br> [in]            REFIID          riid, <br> [out, iid_ is (riid)] LPUNKNOWN * ppUnk <br> ) |

| Parameter Description for the GetIEnumGUID operation: | |
|---|---|
| Riid | This method returns enumerators, which enumerate top level interfaces supported by this PlugIn.IEnumGUID |

Init

| Declaration |
|---|
| HRESULT Init ( <br> [in] IIotDbServer* pIotDbServer, <br> [out] DWORD* nNumInterfaces <br> ) |

| Parameter Descriptions for the Init operation: | |
|---|---|
| pIotDbServer | An interface exposed by an object in the DAS engine for use by the PlugIn. |

Remarks

The init operation allows the DAS engine 90 to initialize this plugIn and provides an interface pointer back into the DAS engine 90 for use by the plugIn.

IsShutdownPossible

Declaration

HRESULT IsShutdownPossible([out] BOOL *bShutdown)

Remarks

IsShutdownPossible allows the DAS engine 90 to ask each plugIn whether the plugIn can be shutdown. Typically the plugIn will answer with:
 TRUE when there is no external client attached to the plugin and with
 FALSE when there is external clients attached to the plugIn
Return codes:
 S_OK—Success
 S_FAIL—Failed, indicates that the PlugIn maybe in an undefined state Shutdown Declaration HRESULT Shutdown ( )

Remarks

Shutdown is an operation that allows the DAS engine 90 to notify a particular plugin that the data access server 50 will be shut down. In response to this notification, the plugin is expected to:
 1. Release all interface references to the DAS engine
 2. Notify clients (if any) that the DA server is disconnecting (In a way similar to IOPCShutdown::Shutdown Request( . . . )).
 Note that shutdown does not determine whether the plugin can be shut down or not. The plugin is informed about the possible shutdown and is written in a way such that the server can be shutdown in any moment after a Shutdown( ) method is invoked.
 Return codes:
 S_OK—Success
 S_FALSE—partial success, indicates that the plugIn maybe in-undefined state Turning now to FIG. 9, a set of interfaces supported by operations executed within the DAS engine layer 90 are identified. These interfaces are executed by the DAS engine layer 90 in response to calls by data exchange protocol-specific plugins to facilitate data communication between the data access server 50 and communicatively connected client applications that potentially operate according to a variety of data exchange protocols supported by the data access servers' set of client protocol plugins. Thus, the interfaces described herein below represent a superset of the interface operations executed by the DAS engine 90 to interact with all supported data exchange protocol plugins installable on the DAS 50 embodying the present invention.

An IiotDbServer interface 600 enables data exchange protocol plugins to manipulate group handling by the DAS engine 90 and invoke particular global services such as, for example, setting local Ids, validating data items, etc.

| Declaration |
|---|
| [ <br> object, |

-continued

```
    uuid (AD50D6D1-B4A1-11D2-A9BF-00A0C9ED0BF0),
    helpstring ("IIotDbServer Interface"),
    pointer_default (unique)
]
interface IIotDbServer : IUnknown
{
    HRESULT GetModuleName (
        [out, string] LPWSTR* ppModuleName
    );
    HRESULT AddGroup(
        [in, string]         LPCWSTR          szName,
        [in]                 BOOL             bActive,
        [in]                 DWORD            dwRequestedUpdateRate,
        [in]                 PIHANDLE         hPlugInGroup,
        [unique, in]         LONG             * pTimeBias,
        [in]                 FLOAT            * pPercentDeadband,
        [in]                 DWORD            dwLCID,
        [out]                CTHANDLE         * phServerGroup,
        [out]                DWORD            * pRevisedUpdateRate,
        [in]                 IIoPiData*       pIIoPiData,
        [in]                 REFIID           riid,
        [out, iid_is (riid)] LPUNKNOWN * ppUnk
    );
    HRESULT GetStatus(
        [out] CTSERVERSTATUS ** ppServerStatus
    );
    HRESULT RemoveGroup(
        [in] CTHANDLE   hServerGroup,
        [in] BOOL       bForce
    );
    HRESULT GetErrorString(
        [in]              HRESULT         dwError,
        [in]              LCID            dwLocale,
        [out, string] LPWSTR  * ppString
    );
    HRESULT QueryAvailableLocaleIDs (
        [out] DWORD *pdwCount,
        [out, size_is (,*pdwCount)] LCID **pdwLcid
    );
    HRESULT ValidateItems (
        [in]                         DWORD               dwNumItems,
        [in, size_is (dwNumItems)]   CTITEMDEF           * pItemArray,
        [out, size_is (,dwNumItems)] CTITEMRESULT        ** ppValidationResults,
        [out, size_is (,dwNumItems)] HP.ESULT            ** ppErrors
    );
    HRESULT QueryOrganization (
        [out] CTNAMESPACETYPE  * pNameSpaceType
    );
    HRESULT BrowseCfgNode (
        [in]                         CSHANDLE            hCfgNode,
        [out]                        CSHANDLE            * phParent,
        [in]                         BOOL                bBranches,
        [out]                        DWORD               *pdwBranchCount,
        [out, size_is (,*pdwBranchCount)] CSHANDLE       ** pphBranches,
        [in]                         BOOL                bLeafs,
        [out]                        DWORD               *pdwLeaf Count,
        [out, size_is (,*pdwLeaf Count)] CSHANDLE        ** pphLeaves,
        [in]                         BOOL                bTopics,
        [out)                        DWORD               *pdwTopicCount,
        [out, size_is (,*pdwTopicCount)] CSHANDLE        ** pphTopics
    );
    HRESULT GetCfgNodeByNameId (
        [in, string]      LPCWSTR         szName,
        [out]             CSHANDLE        * hNode
    );
    HRESULT GetCfgNodeByPartialName (
        [in]              CSHANDLE        hCurrentNode,
        [in, string]      LPCWSTR         szName,
        [out]             CSHANDLE        * hNode
    );
    HRESULT GetCfgNodeByTopicName (
        [in, string]      LPCWSTR         szTopicName,
        [out]             CSHANDLE        * hNode
    );
    HRESULT GetCfgNameIdByNode (
        [in]              CSHANDLE        hNode,
        [out, string]     LPWSTR          * ppName
    );
```

```
           -continued
    HRESULT GetCfgNodeAttributes (
        [in]                            DWORD      dwNumCfgNodes,
        [in, size_is (dwNumCfgNodes)]   const CSHANDLE  * pCfgNodeArray,
        [out, size_is (,dwNumCfgNodes)] CTCFGNODEATTRIBUTES **
    ppCtCfgNodeAttributes
        );
    }
```

The following is a description of exemplary operations offered within the scope of the IioDbServer interface 600.

Operations

AddGroup

| Declaration |
| --- |
| HRESULT AddGroup ( |

| | | |
| --- | --- | --- |
| [in, string] | LPCWSTR | szName, |
| [in] | BOOL | bActive, |
| [in] | DWORD | dwRequestedUpdateRate, |
| [in] | PIHANDLE | hPlugInGroup, |
| [unique, in] | LONG | * pTimeBias, |
| [in] | FLOAT | * pPercentDeadband, |
| [in] | DWORD | dwLCID, |
| [out] | CTHANDLE | * phServerGroup, |
| [out] | DWORD | * pRevisedUpdateRate, |
| [in] | IIopiData* | pIIoPiData, |
| [in] | REFIID | riid, |
| [out, iid_is (riid)] | LPUNKNOWN | * ppUnk |

| Parameters | |
| --- | --- |
| SzName | Name of the requested group. |
| Bactive | TRUE if the new group should be created initially active. |
| dwRequestedUpdateRate | Suggestion for the update rate. This number typically will come from the end Client, and be passed down through the PlugIn. This number may or may not be possible. |
| HplugInGroup | This handle identifies the group to the Plug In. We must remember it on later notifications. |
| PtimeBias | pointer to the time bias in minutes (like bias fielsd in W32 time zone) |
| PpercentDeadband | Hysteretic deadband, to keep from reporting jitter. |
| DwLCID | locale ID |
| PhServerGroup | This handle identifies the group to the DAS Engine. We pass this back so the PlugIn will be able to identify this group in later transactions. |
| PRevisedUpdateRate | The actual update rate we were able to meet. This may or may not agree with the requested update rate. |
| PIIoPiData | PlugIn passes its IoPiData interface. |
| Riid | PlugIn specifies the desired interface type. |
| PpUnk | DAS Engine returns a pointer to an implementation of the desired interface type, or NULL if none exists. |

Remarks

This operation enables a data exchange protocol plugin to request the DAS Engine 90 to create a group. This may require the DAS Engine 90 to get details from the server-specific code at the device protocol layer 96 of the DAS 50.

BrowseCfgNode

| Declaration |
| --- |
| HRESULT BrowseCfgNode ( |

| | | |
| --- | --- | --- |
| [in] | CSHANDLE | hCfgNode, |
| [out] | CSHANDLE | * phParent, |
| [in] | BOOL | bBranches, |
| [out] | DWORD | *pdwBranchCount, |
| [out, size_is (,*pdwBranchCount)] | CSHANDLE | ** pphBranches, |
| [in] | BOOL | bLeafs, |
| [out] | DWORD | *pdwLeafCount, |
| [out, size_is (,*pdwLeafCount)] | CSHANDLE | ** pphLeaves, |
| [in] | BOOL | bTopics, |
| [out] | DWORD | *pdwTopicCount, |
| [out, size_is (,*pdwTopicCount)] | CSHANDLE | ** pphTopics |
| ) | | |

| Parameters | |
| --- | --- |
| HcfgNode | safe handle of node to browse at, INVALID_CSHANDLE for ROOT |
| PhParent | safe handle of parent node, INVALID_CSHANDLE if the node has no parent |
| Bbranches | flag whether to obtain array with Branches |
| PdwBranchCount | number of child branches at node |
| PphBranches | A pointer to an array of pdwBranchCount CSHANDLES. The DAS Engine creates this array, and passes a pointer toit out as a return value. NOTE: It is the responsibility of the PlugIn to dispose of the memory holding the array, when done with it. dispose of the memory holding the array, when done with it. |
| Bleaves | flag whether to obtain array with Leaves |
| PdwLeafCount | number of child leaves at node |
| PphLeaves | A pointer to an array of pdwLeaf Count CSHANDLES. The DAS Engine creates this array, and passes a pointer to it (out) as a return value. NOTE: It is the responsibility of the PlugIn to dispose of the memory holding the array, when done with it. |
| Btopics | flag whether to obtain array with Topics |
| PdwTopicCount | number of access paths/topics at node |
| PphTopics | A pointer to an array of pdwTopicCount CSHANDLES. The DAS Engine creates this array, and passes a pointer to it (out) as a return value. NOTE: It is the responsibility of the PlugIn to dispose of the memory holding the array, when done with it. |

Remarks

This operation enables a client application, through a particular data exchange protocol plugin, to request the DAS engine 90 to browse at a specified node and to retrieve all child objects: sub branches, leaves and access paths/topics.

GetCfgNameIdByNode

Declaration

```
HRESULT GetCfgNameIdByNode(
[in]         CSHANDLE    hNode,
[out, string] LPWSTR     * ppName
)
```

Parameters

| | |
|---|---|
| HNode | Node DAS engine handle. |
| ppName | Name of the fully qualified node name. |

Remarks

The GetCfgNameIdByNode operation enables a plugin to retrieve the fully qualified name id of a node, (full name path including delimiters up to the node).

GetCfgNodeAttributes

Declaration

```
HRESULT GetCfgNodeAttributes(
[in]                            DWORD      dwNumCfgNodes,
[in, size_is(dWNumCfgNodes)] const CSHANDLE * pCfgNodeArray,
[out, size_is(,dwNumCfgNodes)] CTCFGNODEATTRIBUTES **
ppCtCfgNodeAttributes
)
```

Parameters

| | |
|---|---|
| DwNumCfgNodes | Number of nodes to get attributes of. |
| PCfgNodeArray | safe handle array of nodes to get attributes of: |
| ppCtCfgNodeAttributes | A pointer to an array of dwNumCfgNodes cfg node attributesThe DAS Engine creates this array, and passes a pointer to it out as a return value. NOTE: It is the responsibility of the PlugIn to dispose of the memory holding the array, when done with it. |

Remarks

This operation enables a client application, via a data exchange protocol plugin, to request the DAS engine 90 to browse a specified node to retrieve all child objects: sub branches, leaves and access paths/topics.

GetCfgNodeByNameId

Declaration

```
HRESULT GetCfgNodeByNameId(
[in, string]  LPCWSTR   szName,
[out]         CSHANDLE  * hNode
)
```

Parameters

| | |
|---|---|
| szName | Name of the fully qualified node name. |
| HNode | Node DAS engine handle. |

Remarks

This operation enables a plugin to request the DAS engine 90 to provide a node handle corresponding to a fully qualified name ID (full name path including delimiters up to the node) specified by the plugin.

GetCfgNodeByPartialName

Declaration

```
HRESULT GetCfgNodeByPartialName(
[in]          CSHANDLE   hCurrentNode,
[in, string]  LPCWSTR    szName,
[out]         CSHANDLE   * hNode
)
```

Parameters

| | |
|---|---|
| hCurrentNode | The DAS engine handle of a node to start the search from, or INVALID_CSHANDLE to start at the root. |
| SzName | Some fragment of the name starting immediately below the node indicated by hCurrentNode. For instance, if a fully-qualified item name is "Server.Port1.PLC1.Item1", then if hCurrentNode represents the "Port1." node under the "Server" root ("Server.Port1."), the handle for "Server.Port1.PLC1." could be retrieved using hCurrentNode and "PLC1". Similarly, the handle for the leaf could be retrieved using hCurrentNode and "PLC1.Item1". |
| HNode | Node DAS engine handle. |

Remarks

This operation enables a plugin to request the DAS engine 90 to provide a node handle corresponding to name ID fully specified by a current node and a fragment of the name beginning at the current node.

GetCfgNodeByTopicName

Declaration

```
HRESULT GetCfgNodeByTopicName(
[in, string]  LPCWSTR    szTopicName,
[out]         CSHANDLE   * hNode
)
```

Parameters

| | |
|---|---|
| szTopicName | Name of the fully qualified topic name. |
| Hnode | Node DAS engine handle. |

Remarks

This operation enables a plugin to request the DAS engine 90 to provide a node handle by specifying a fully qualified name id of the topic/OPC access path.

GetErrorString

Declaration

```
HRESULT GetErrorString(
    [in]         HRESULT    dwError,
    [in]         LCID       dwLocale,
    [out, string] LPWSTR    * ppString
)
```

Parameters

| | |
|---|---|
| dwError | error code |
| dwLocale | locale ID |
| ppString | returned error text |

Remarks

This operation enables a plugin to request the DAS engine 90 to provide error text for a specified error code and locale.

GetModuleName

Declaration

```
HRESULT GetModuleName(
    [out, string] LPWSTR* ppModuleName
)
```

Parameters

| | |
|---|---|
| ppModuleName | Server EXE module name, less extension. |

Remarks

This operation enables a plugin to request the DAS engine 90 to return the DAS 50's EXE module name, less any file extension.

GetStatus

Declaration

```
HRESULT GetStatus(
    [out] CTSERVERSTATUS ** ppServerStatus
)
```

Parameters

| | |
|---|---|
| ppServerStatus | DAS Engine keeps a local CTSERVERSTATUS structure, and returns a pointer to it. |

Remarks

This operation enables a plugin to request the DAS engine 90 to provide a pointer to a status for the DAS 50 as a whole.

QueryAvailableLocaleIDs

Declaration

```
HRESULT QueryAvailableLocaleIDs(
    [out] DWORD *pdwCount,
    [out, size_is(, *pdwCount)] LCID **pdwLcid
)
```

Parameters

| | |
|---|---|
| pdwCount | number of locale ids |
| pdwLcid | list of locale ids |

Remarks

This operation enables a plugin to request the DAS engine 90 to provide a list of supported locale IDs.

QueryOrganization

Declaration

```
HRESULT QueryOrganization(
    [out] CTNAMESPACETYPE  * pNameSpaceType
)
```

Parameters

| | |
|---|---|
| PnameSpaceType | DAS engine returns either: CT_NS_HIERARCHIAL or CT_NS_FLAT. |

Remarks

This operation allows a plugin to query the configuration organization of the server. A server is configured either flat or hierarchical.

RemoveGroup

Declaration

```
HRESULT RemoveGroup(
    [in] CTHANDLE    hServerGroup,
    [in] BOOL        bForce
)
```

Parameters

| | |
|---|---|
| hServerGroup | This handle specifies the group to the DAS Engine. It must be the handle as returned through the phServerGroup argument of a previous call to the AddGroup method. |

Remarks

This operation allows a plugin to request the DAS engine 90 to remove a previously-created group.

ValidateItems

| Declaration |
| --- |
| HRESULT ValidateItems(<br>  [in]                            DWORD                  dwNumItems,<br>  [in, size_is(dwNumItems)]     CTITEMDEF   *  pItemArray,<br>  [out, size_is(,dwNumItems)]   CTITEMRESULT  **  ppValidationResults,<br>  [out, size_is(,dwNumItems)]   HRESULT        **  ppErrors<br>) |

| Parameters | |
| --- | --- |
| dwNumItems | Number of items to validate. |
| pItemArray | An array of dwNumItems CTITEMDEF structures. Each element in the array defines an item to be created or located, and added to the group. |
| ppValidationResults | A pointer to an array of dwNumItems CTITEMRESULT structures. The DAS Engine creates this array, and passes a pointer to it out as a return value. NOTE: It is the responsibility of the PlugIn to dispose of the memory holding the array, when done with it. |
| PpErrors | An array of HRESULTs. These are the individual error codes for each item being reported. The DAS Engine creates this array, and passes a pointer to it out as a return value. |

-continued

| Parameters | |
| --- | --- |
| | NOTE: It is the responsibility of the PlugIn to dispose of the memory holding the array, when done with it. |

Remarks

This operation is similar to an AddItems operation in the IIotItemMgt interface 606 (described herein below) of the group object. Since item syntax is independent of a group this operation performs the same validation on the item definition. This operation enables a plugin to satisfy groupless client activities (only for on demand calls).

An IiotDemand interface 602 enables plugins to submit out-of-band (outside the regular update period) requests to the DAS engine 90 for arrays of specified data items after the groups and physical data items are created, added and activated.

```
Declaration
[
    object,
    uuid (AD50D6D5-B4A1-11D2-A9BF-00A0C9ED0BF0),
    helpstring("IIotDemand Interface"),
    pointer_default (unique)
]
interface IIotDemand : IUnknown
{
    HRESULT ReadCache(
        [in]                         DWORD              dwNumItems,
        [in, size_is(dwNumItems)]    CTHANDLE      *    phCoreToolkit,
        [out, size_is(,dwNumItems)]  CTITEMSTATE   **   ppItemValues,
        [out, size_is(,dwNumItems)]  HRESULT       **   ppErrors
    );
    HRESULT ReadDevice(
        [in]                         DWORD dwCount,
        [in, size_is(dwCount)]       CTHANDLE * phCoreToolkit,
        [in]                         CTTRANSACTIONDEF  TransactionDef,
        [unique, in]     LONG        *    pTimeBias,
        [in]             DWORD             dwLCID,
        [out, size_is(,dwCount)]     HRESULT ** ppErrors,
        [out]                        CTHANDLE*          CancelID
    );
    HRESULT WriteDevice(
        [in]                         DWORD dwCount,
        [in, size_is(dwCount)]       CTHANDLE  * phCoreToolkit,
        [in, size_is(dwCount)]       VARIANT    * pItemValues,
        [in]             CTTRANSACTIONDEF  TransactionDef,
        [unique, in]     LONG        *    pTimeBias,
        [in]             DWORD             dwLCID,
        [out, size_is(,dwCount)]     HRESULT ** ppErrors,
        [out]                        CTHANDLE*          CancelID
    );
    HRESULT Cancel(
        [in]                         CTHANDLE           CancelID
    );
}
```

Description

After groups and items are created, added, and activated, this interface enables plugins to submit out-of-band data access requests to arrays of specified items maintained/monitored by the DAS engine 90. In many cases, these actions will take a long time, and will proceed asynchronously. The completions for these asynchronous calls will be reported on methods of the IIoPiData interface.

The following is a description of exemplary operations for carrying out the IiotDemand interface 602.

Operations

Cancel

|  |  |  |
|---|---|---|
|  | Declaration |  |
|  | HRESULT Cancel( |  |
| [in] | CTHANDLE | CancelID |
| ) |  |  |

| Parameters | |
|---|---|
| CancelID | Cancel ID as supplied in the transaction initiation. |

Remarks

This operation enables a plugin to cancel any pending asynchronous transaction (demand calls or refreshes) that was previously requested of the DAS engine 90.

ReadCache

|  |  |  |  |
|---|---|---|---|
|  | Declaration |  |  |
|  | HRESULT ReadCache( |  |  |
| [in] | DWORD |  | dwNumItems, |
| [in, size_is(dwNumItems)] | CTHANDLE | * | phCoreToolkit, |
| [out, size_is(,dwNumItems)] | CTITEMSTATE | ** | ppItemValues, |
| [out, size_is(,dwNumItems)] | HRESULT | ** | ppErrors |
| ) |  |  |  |

| Parameters | |
|---|---|
| DwNumItems | Count of items to be read from cache. |
| PhCoreToolkit | Array of dwNumItems handles. These are the handles that identify the items to the DAS Engine, and were supplied to the PlugIn during IIotItemMgt::AddItems. This array is supplied by the PlugIn. |
| PpItemValues | A pointer to an array of CTITEMSTATE structures. This array is created by the DAS Engine, and a pointer to it is passed out as a return value. Each CTITEMSTATE in the array indicates the current item state for the specified item.<br>NOTE: It is the responsibility of the PlugIn to dispose of the memory holding the array, when done with it. |
| PpErrors | A pointer to an array of HRESULTs. This array is created by the DAS Engine, and a pointer to it is passed out as a return value. Each HRESULT gives an error code for the specified item.<br>NOTE: It is the responsibility of the PlugIn to dispose of the memory holding the array, when done with it. |

Remarks

This operation proceeds synchronously, and invokes the DAS engine 90 to return a current VTQ from the cache including an array of dwNumItems items.

ReadDevice

|  |  |  |  |
|---|---|---|---|
|  | Declaration |  |  |
|  | HRESULT ReadDevice( |  |  |
| [in] | DWORD dwCount, |  |  |
| [in, size_is(dwCount)] | CTHANDLE * phCoreToolkit, |  |  |
| [in] | CTTRANSACTIONDEF TransactionDef, |  |  |
| [unique, in] | LONG | * pTimeBias, |  |
| [in] | DWORD | dwLCID, |  |
| [out, size_is(,dwCount)] | HRESULT ** ppErrors, |  |  |
| [out] | CTHANDLE* | Cancel ID |  |
| ) |  |  |  |

| Parameters | |
|---|---|
| DwCount | Count of items requested. |
| PhCoreToolkit | Array of dwCount handles. These are the handles that identify the items to the DAS Engine, and were supplied to the PlugIn during TIotItemMgt : :AddItems. This array is supplied by the PlugIn. |
| TransactionDef | Transaction definition. This will uniquely identify the demand read transaction when completion is signalled using IIoPiData : :OnWriteComplete( ). This identifier is supplied by the DAS Engine. |
| PTimeBias | pointer to the time bias in minutes (like bias fields in W32 time zone) |
| DwLCID | locale ID, OPC will only do demand calls for items of the same group, so the OPC plug in will supply the locale ID and time bias of the group |
| PpErrors | A pointer to an array of HRESULTs. It is possible that one or more of the specified items does not exist, or is otherwise invalid. This array is created by the DAS Engine, and a pointer to it is passed out as a return value.<br>NOTE: It is the responsibility of the PlugIn to dispose of the memory holding the array, when done with it. |
| CancelID | Cancel ID for the plug in to cancel the transaction. |

Remarks

This operation proceeds asynchronously. Completion is signaled by the DAS engine 90 on IIoPiData::OnReadComplete( ). This operation enables a plugin to request the DAS engine 90 to perform a demand read for a list of items. This demand read commences as soon as any bus activity is complete, and returns with higher priority than any scanned data.

WriteDevice

| Declaration |
|---|
| HRESULT WriteDevice(<br>  [in]                             DWORD dwCount,<br>  [in, size_is(dwCount)]    CTHANDLE  *  phCoreToolkit,<br>  [in, size_is(dwCount)]    VARIANT    *  pItemValues,<br>  [in]                             CTTRANSACTIONDEF TransactionDef,<br>  [unique, in]               LONG    *  pTimeBias,<br>  [in]                             DWORD    dwLCID,<br>  [out, size_is(,dwCount)]  HRESULT  **  ppErrors,<br>  [out]                            CTHANDLE  *  CancelID<br>) |

| Parameters | |
|---|---|
| DwCount | Count of items to be written. |
| PhCoreToolkit | Array of dwCount handles. These are the handles that identify the items to the DAS Engine, and were supplied to the PlugIn during IIotItemMgt::AddItems. This array is supplied by the PlugIn. |
| PItemValues | Array of dwCount variant values. These are the new values for the items. |
| TransactionDef | Transaction definition. This will uniquely identify the demand read transaction when completion is signalled using IIoPiData::OnWriteComplete ( ). This identifier is supplied by the DAS Engine. |
| PTimeBias | pointer to the time bias in minutes (like bias fields in W32 time zone) |
| DwLCID | locale ID, OPC will only do demand calls for items of the same group, so the OPC plug in will supply the locale ID and time bias of the group |
| PpErrors | A pointer to an array of HRESULTs. It is possible that one or more of the specified items does not exist, or is otherwise invalid. This array is created by the DAS Engine, and a pointer to it is passed out as a return value.<br>NOTE: It is the responsibility of the PlugIn to dispose of the memory holding the array, when done with it. |
| CancelID | Cancel ID for the plug in to cancel the transaction. |

Remarks

This operation proceeds asynchronously. Completion is signaled by the DAS engine 90 on IIoPiData::OnWriteComplete( ). This operation enables a plugin to request the DAS engine 90 to perform a write to a list of items. This write commences as soon as any bus activity is complete, and returns with higher priority than any scanned data.

An IIotGroupStateMgt interface 604 enables plugins to manipulate groups created on the DAS 50.

| Declaration |
|---|
| [<br>  object,<br>  uuid(2030A921-0788-11d3-82C2-00A024A866AC)<br>  helpstring("IIotGroupStateMgt Interface"),<br>  pointer_default (unique)<br>]<br>interface IIotGroupStateMgt          : IUnknown<br>{<br>  HRESULT GetState(<br>    [out]            DWORD    * pUpdateRate,<br>    [out]            BOOL     * pActive,<br>    [out, string]  LPWSTR    * ppName,<br>    [out]            LONG     * pTimeBias, |

| -continued |
|---|
|     [out]          FLOAT     * pPercentDeadband,<br>    [out]          DWORD    * pLCID,<br>    [out]          PIHANDLE * phPlugInGroup,<br>    [out]          CTHANDLE * phCoreToolkitGroup<br>  );<br>  HRESULT SetState(<br>    [unique, in]  DWORD    * pRequestedUpdateRate,<br>    [out]          DWORD    * pRevisedUpdateRate,<br>    [unique, in]  BOOL      * pActive,<br>    [unique, in]  LONG      * pTimeBias,<br>    [unique, in]  FLOAT     * pPercentDeadband,<br>    [unique, in]  DWORD    * pLCID,<br>    [unique, in]  PIHANDLE * phClientGroup<br>  );<br>  HRESULT SetName(<br>    [in, string]    LPCWSTR szName<br>  );<br>  HRESULT CloneGroup(<br>    [in, string]        LPCWSTR         szName,<br>    [in]                  IIoPiData*        pIIoPiData,<br>    [out]               CTHANDLE      *phServerHandle,<br>    [in]                  REFIID             riid,<br>    [out, iid_is(riid)]  LPUNKNOWN     * ppUnk<br>  );<br>} |

Description

This interface enables plugins to manipulate groups that are created on the DAS 50.

The following is a description of exemplary operations for carrying out the IIotGroupStateMgt interface 604.

Operations

CloneGroup

| Declaration |
|---|
| HRESULT CloneGroup(<br>  [in, string]       LPCWSTR         szName,<br>  [in]                 IIoPiData*        pIIoPiData,<br>  [out]              CTHANDLE      *phServerHandle,<br>  [in]                 REFIID             riid,<br>  [out, iid_is(riid)]  LPUNKNOWN   * ppUnk<br>) |

| Parameters | |
|---|---|
| SzName | Unique name of the new group. |
| PIIoPiData | PlugIn passes its IoPiData interface. |
| Riid | PlugIn specifies the desired interface type. |
| PpUnk | DAS Engine returns a pointer to an implementation of the desired interface type, or NULL if none exists. |

Remarks:

This operation creates a copy of the existing group with the same characteristics as the original.

GetState

| Declaration |
|---|
| HRESULT GetState(<br>  [out]               DWORD     * pUpdateRate,<br>  [out]               BOOL      * pActive, |

GetState

-continued

Declaration

```
            HRESULT GetState(
[out, string]   LPWSTR      * ppName,
[out]           LONG        * pTimeBias,
[out]           FLOAT       * pPercentDeadband,
[out]           DWORD       * pLCID,
[out]           PIHANDLE    * phPlugInGroup,
[out]           CTHANDLE    * phCoreToolkitGroup
)
```

Parameters

| Parameters | Description |
|---|---|
| PUpdateRate | The current update rate. The Update Rate is in milliseconds |
| Pactive | The current active state of the group. |
| PpName | The current name of the group |
| PTimeBias | The TimeZone Bias of the group (in minutes) |
| pPercentDeadband | The percent change in an item value that will cause an exception report of that value to a client. This parameter only applies to items in the group that have dwEUType of Analog. [See discussion of Percent Deadband in General Properties Section] |
| PLCID | The current LCID for the group. |
| phPlugInGroup | The client (Plugin) supplied group handle |
| phCoreToolkitGroup | The server generated group handle |

Remarks: This operation gets the current state of the group.

SetName

Declaration

```
HRESULT SetName(
[in, string] LPCWSTR szName
)
```

Parameters

| Parameters | Description |
|---|---|
| SzName | New name for group. |

Remarks:
This operation changes the name of a existing group. The name must be unique.

SetState

Declaration

```
                HRESULT SetState(
[unique, in]    DWORD       * pRequestedUpdateRate,
[out]           DWORD       * pRevisedUpdateRate,
[unique, in]    BOOL        * pActive,
[unique, in]    LONG        * pTimeBias,
[unique, in]    FLOAT       * pPercentDeadband,
[unique, in]    DWORD       * pLCID,
[unique, in]    PIHANDLE    * phClientGroup
)
```

Parameters

| Parameters | Description |
|---|---|
| pRequestedUpdateRate | New update rate requested for the group by the client (milliseconds) |
| pRevisedUpdateRate | Closest update rate the server is able to provide for this group. |
| Pactive | TRUE (non-zero) to active the group. FALSE (0) to deactivate the group. |
| PtimeBias | TimeZone Bias if Group (in minutes). |
| pPercentDeadband | The percent change in an item value that will cause an exception report of that value to a client. This parameter only applies to items in the group that have dwEUType of Analog. See discussion of Percent Deadband in the General Information Section |
| PLCID | The Localization ID to be used by the group. |
| phClientGroup | New client supplied handle for the group. This handle is returned in the data stream provided to the client's IAdvise by the Groups IDataObject. |

Remarks:

This operation enables a client to set various properties of the group. Pointers to 'in' items are used so that the client can omit properties the client does not want to change by passing a NULL pointer. The pRevisedUpdateRate argument must contain a valid pointer.

An IiotItemMgt interface 606 enables plugins to request the DAS engine 90 to add, validate, and remove items within the context of a specified group. The IiotItemMgt interface 606 is implemented in the DAS engine 90 by a group object.

```
Declaration
[
    object,
    uuid(AD50D6D3-B4A1-11D2-A9BF-00A0C9ED0BF0),
    helpstring("IIotItemMgt Interface"),
    pointer_default(unique)
]
interface IIotItemMgt : IUnknown
{
    HRESULT AddItems(
        [in]                    DWORD                   dwNumItems,
```

-continued

```
        [in, size_is(dwNumItems)]    CTITEMDEF      * pItemArray,
        [out, size_is(,dwNumItems)]  CTITEMRESULT   ** ppAddResults,
        [out, size_is(,dwNumItems)]  HRESULT        ** ppErrors
    );
    HRESULT ValidateItems(
        [in]                         DWORD             dwNumItems,
        [in, size_is(dwNumItems)]    CTITEMDEF      * pItemArray,
        [out, size_is(,dwNumItems)]  CTITEMRESULT   ** ppValidationResults,
        [out, size_is(,dwNumItems)]  HRESULT        ** ppErrors
    );
    HRESULT RemoveItems(
        [in]                         DWORD             dwNumItems,
        [in, size_is(dwNumItems)]    CTHANDLE       * phCoreToolkit,
        [out, size_is(,dwNumItems)]  HRESULT        ** ppErrors
    );
    HRESULT SetActiveState(
        [in]                         DWORD             dwNumItems,
        [in, size_is(dwNumItems)]    CTHANDLE       * phCoreToolkit,
        [in]                         BOOL              bActive,
        [out, size_is(,dwNumItems)]  HRESULT        ** ppErrors
    );
    HRESULT SetClientHandles(
        [in] DWORD dwNumItems,
        [in, size_is(dwNumItems)] CTHANDLE    * phCoreToolkit,
        [in, size_is(dwNumItems)] PIHANDLE    * phPlugIn,
        [out, size_is(,dwNumItems)] HRESULT   ** ppErrors
    );
    HRESULT SetDatatypes(
        [in] DWORD dwCount,
        [in, size_is(dwCount)] CTHANDLE    * phCoreToolkit,
        [in, size_is(dwCount)] VARTYPE * pRequestedDatatypes,
        [out, size_is(,dwCount)] HRESULT ** ppErrors
    );
    HRESULT CreateEnumerator(
        [in] REFIID riid,
        [out, iid_is(riid)] LPUNKNOWN* ppUnk
    );
    HRESULT GetItemCount(
        [out] DWORD* dwItemCount
    );
    HRESULT Refresh(
        [in] CTDATASOURCE dwSource,
        [in]     CTTRANSACTIONDEF     TransactionDef,
        [out] DWORD *pdwCancelID
    );
}
```

Description

The IiotItemMgt interface 606 is implemented by a group object in the DAS engine 90. It allows items to be added, validated, and removed within the context of a group. The following is a description of exemplary operations for carrying out the IiotItemMgt interface 606.

Operations

AddItems

| Declaration |
|---|
| HRESULT AddItems( |
| [in]                         DWORD             dwNumItems, |
| [in, size_is(dwNumItems)]    CTITEMDEF      * pItemArray, |
| [out, size_is(,dwNumItems)]  CTITEMRESULT   ** ppAddResults, |
| [out, size_is(,dwNumItems)]  HRESULT        ** ppErrors |
| ) |

| Parameters | |
|---|---|
| DwNumItems | Number of items to add to this group. |
| PItemArray | An array of dwNumItems CTITEMDEF structures. Each element in the array defines an item to be created or located, and added to the group. |
| PpAddResults | A pointer to an array of dwNumItems CTITEMRESULT structures. The DAS Engine creates this array, and passes a pointer to it out as a return value. NOTE: It is the responsibility of the PlugIn to dispose of the memory holding the array, when done with it. |
| PpErrors | An array of HRESULTs. These are the individual error codes for each item being reported. The DAS Engine creates this array, and passes a pointer to it out as a return value. NOTE: It is the responsibility of the PlugIn to dispose of the memory holding the array, when done with it. |

Remarks

This operation provides a list interface function similar to OPC. This operation allows a plugin to request the DAS engine 90 to create (or provide a location of, if existing) a list of items and return the result codes for the whole list.

CreateEnumerator

Declaration

```
HRESULT CreateEnumerator(
    [in] REFIID riid,
    [out, iid_is(riid)] LPUNKNOWN* ppUnk
)
```

Parameters

| | |
|---|---|
| Riid | requested interface id. |
| PpUnk | returned requested interface pointer or NULL. |

Remarks

This operation enables a plugin to request the DAS engine 90 to create an enumerator for items in a DAS engine 90 group.

GetItemCount

Declaration

```
HRESULT GetItemCount(
    [out] DWORD* dwItemCount
)
```

Parameters

| | |
|---|---|
| dwItemCount | Return the item count here. |

Remarks

This operation enables a plugin to request the DAS engine 90 to provide the count of the total number of items in a group, regardless of their state.

Refresh

Declaration

```
HRESULT Refresh(
    [in] CTDATASOURCE dwSource,
    [in] CTTRANSACTIONDEF TransactionDef,
    [out] DWORD *pdwCancelID
)
```

Parameters

| | |
|---|---|
| DwSource | requested data source: cache or device. |
| TransactionDef | Transaction definition. This will uniquely identify the refresh transaction when completion is signalled using IIoPiData::OnData ( ). This identifier is supplied by the DAS Engine. |
| PdwCancelID | DAS engine supplied cancel ID. |

Remarks

This operation enables a plugin to request the DAS engine 90 to force an update of on active items in a group.

RemoveItems

Declaration

```
HRESULT RemoveItems(
    [in]                    DWORD        dwNumItems,
    [in, size_is(dwNumItems)]  CTHANDLE  * phCoreToolkit,
    [out, size_is(,dwNumItems)] HRESULT  ** ppErrors
)
```

Parameters

| | |
|---|---|
| DwNumItems | Number of items to remove from this group. Special case: a value of DWORD_MAX means delete all items currently in this group. |
| PhCoreToolkit | An array of dwNumItems handles. These handles identify each item to the DAS Engine. The handles were created by the DAS Engine when the AddItems ( ) method was called, and passed out as part of the CTITEMRESULT structures in the ppAddResults array. |
| PpErrors | An array of dwNumItems HRESULTs. These are the individual error codes for each item being reported. The DAS Engine creates this array, and passes a pointer to it out as a return value. NOTE: It is the responsibility of the PlugIn to dispose of the memory holding the array, when done with it. |

Remarks

This operation enables a plugin to request a DAS engine 90 to remove a list of items previously added to the group.

SetActiveState

Declaration

```
HRESULT SetActiveState(
    [in]                    DWORD        dwNumItems,
    [in, size_is(dwNumItems)]  CTHANDLE  * phCoreToolkit,
    [in]                    BOOL         bActive,
    [out, size_is(,dwNumItems)] HRESULT  ** ppErrors
)
```

Parameters

| | |
|---|---|
| DwNumItems | Number of items to activate in this group. |
| PhCoreToolkit | An array of dwNumItems handles. These handles identify each item to the DAS Engine. The handles were created by the DAS Engine when the AddItems ( ) method was called, and passed out as part of the CTITEMRESULT structures in the ppAddResults array. |
| BActive | An array of dwNumItems activate/deactivate flags. |
| PpErrors | An array of dwNumItems HRESULTs. These are the individual error codes for each item being reported. The DAS Engine creates this array, and passes a pointer to it out as a return value. NOTE: It is the responsibility of the PlugIn to dispose of the memory holding the array, when done with it. |

Remarks

This operation enables a plugin to request a DAS engine 90 to activate and deactivate a list of items previously added to a group. Activated items are allowed to update their VTQ using IIoPiData::OnReadComplete( ).

SetClientHandles

| Declaration |
|---|
| HRESULT SetClientHandles(<br>  [in] DWORD dwNumItems,<br>  [in, size_is(dwNumItems)] CTHANDLE  * phCoreToolkit,<br>  [in, size_is(dwNumItems)] PIHANDLE   * phPlugIn,<br>  [out, size_is(,dwNumItems)] HRESULT  ** ppErrors<br>) |

| | Parameters |
|---|---|
| DwNumItems | Number of items to change the client handles. |
| PhCoreToolkit | An array of dwNumItems handles. These handles identify each item to the DAS Engine. The handles were created by the DAS Engine when the AddItems ( ) method was called, and passed out as part of the CTITEMRESULT structures in the ppAddResults array. |
| PhPlugIn | An array of new dwNumItems client handles. |
| PpErrors | An array of dwNumItems HRESULTs. These are the individual error codes for each item being reported. The DAS Engine creates this array, and passes a pointer to it out as a return value.<br>NOTE: It is the responsibility of the PlugIn to dispose of the memory holding the array, when done with it. |

Remarks

This operation enables a plugin to request the DAS engine 90 to set new client handles for existing items.

SetDatatypes

| Declaration |
|---|
| HRESULT  SetDatatypes<br>  [in] DWORD dwCount,<br>  [in, size_is(dwCount)] CTHANDLE * phCoreToolkit,<br>  [in, size_is(dwCount)] VARTYPE * pRequestedDatatypes,<br>  [out, size_is(,dwCount)] HRESULT ** ppErrors<br>) |

| | Parameters |
|---|---|
| DwCount | Number of items to set the data type to. |
| PhCoreToolkit | An array of dwNumItems handles. These handles identify each item to the Cor. The handles were created by the DAS Engine when the AddItems ( ) method was called, and passed out as part of the CTITEMRESULT structures in the ppAddResults array. |
| PRequestedDatatypes | An array of dwNumItems requested new data types. |
| PpErrors | An array of dwNumItems HRESULTs. These are the individual error codes for each item being reported. The DAS Engine creates this array, and passes a pointer to it out as a return value.<br>NOTE: It is the responsibility of the PlugIn to dispose of the memory holding the array, when done with it. |

Remarks

This operation enables plugins to request the DAS engine 90 to set new data types for existing items.

ValidateItems

| Declaration | | | |
|---|---|---|---|
| HRESULT ValidateItems(<br>  [in]<br>  [in, size_is(dwNumItems)]<br>  [out, size_is(,dwNumItems)]<br>  [out, size_is(,dwNumItems)]<br>) | DWORD<br>CTITEMDEF<br>CTITEMRESULT<br>HRESULT | *<br><br> | dwNumItems,<br>pItemArray,<br>ppValidationResults,<br>ppErrors |

| | Parameters |
|---|---|
| DwNumItems | Number of items to validate for this group. |
| PitemArray | An array of dwNumItems CTITEMDEF structures. Each element in the array defines an item to be created or located, and added to the group. |
| PpValidationResults | A pointer to an array of dwNumItems CTITEMRESULT structures. The DAS Engine creates this array, and passes a pointer to it out as a return value.<br>NOTE: It is the responsibility of the PlugIn to dispose of the memory holding the array, when done with it. |
| PpErrors | An array of HRESULTs. These are the individual error codes for each item being reported. The DAS Engine creates this array, and passes a pointer to it out as a return value. |

-continued

| Parameters |
|---|
| NOTE: It is the responsibility of the PlugIn to dispose of the memory holding the array, when done with it. |

Remarks

This operation is similar to the previously described AddItems. However, no items are actually created by the DAS engine 90. This operation allows a plugin to determine whether an item name is valid, and its type and status in the event that the item name is valid.

Illustrative embodiments of the present invention and certain variations thereof have been provided in the Figures and accompanying written description. The present invention is not intended to be limited to these embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A process data access server enabling client applications incorporating potentially multiple differing data exchange protocols to access process data stored at potentially many different locations in a process control system, the process data access server comprising:
    a device protocol interface facilitating accessing process data storage locations within the process control system;
    a set of client data exchange protocol modules enabling client applications to request access to process data storage locations via the process data access server according to particular client data exchange protocols supported by the set of client data exchange protocol modules;
    a data access server engine for executing process data access requests, received by the process data access server via the set of client data exchange protocol modules, by accessing, via the device protocol interface, data storage locations corresponding to the process data access requests, and wherein the data access server engine includes a client application data exchange protocol abstraction layer comprising a set of operations callable by ones of the set of client data exchange protocol modules in response to receipt by the set of client data exchange protocol modules of process data access requests; and
    a loading mechanism for determining a presence of at least one of the set of client data exchange protocol modules upon a machine for executing the process data access server, and loading the at least one client data exchange protocol module during a startup process that integrates the at least one client data exchange module with the data access server engine.

2. The process data access server of claim 1 wherein the set of client data exchange protocol modules comprise plugins.

3. The process data access server of claim 2 wherein at least one of the set of client data exchange protocol plugins comprises a dynamic plugin.

4. The process data access server of claim 2 wherein at least one of the set of client data exchange protocol plugins comprises a static plugin.

5. The process data access server of claim 2 wherein the set of protocol conversion modules comprise both static and dynamic plugins.

6. The process data access server of claim 1 wherein ones of the set of client data exchange protocol modules handle data access requests from client applications in accordance with particular client data exchange protocols.

7. The process data access server of claim 1 wherein the set of operations of the data access server engine includes at least one operation callable by at least two distinct ones of the set of client data exchange protocol modules that incorporate distinct data exchange protocols.

8. The process data access server of claim 1 wherein an operational data access server including the device protocol interface, the set of client data exchange protocol modules, and the data access server is created by a start-up process that builds the operational data access server from previously installed program files, and wherein the program files of the client data exchange protocol modules and the data access server are independently designateable with regard of one another.

9. The process data access server of claim 1 wherein the set of interface operations executable by the data access server engine includes an asynchronous data read operation for providing data from an identified data source in response to a client application data request.

10. The process data access server of claim 1 wherein the set of interface operations executable by the data access server engine includes a synchronous read operation that, in accordance with a timer duration expiration event, updates identified process data values via the device protocol interface.

11. The process data access server of claim 10 wherein the synchronous read operation discards an updated process data value for a data item that is determined to be unchanged from a current stored value for the data item, thereby avoiding transmissions of unchanged data values between the process data access server and requesting client applications.

12. The process data access server of claim 1 wherein the set of interface operations executable by the data access server engine includes a group creation operation that creates a first logical group containing a first set of data items.

13. The process data access server of claim 12 wherein a second logical group containing a second set of data items is includable as an item within the first logical group containing the first set of data items.

14. The process data access server of claim 12 wherein the set of interface operations executable by the data access server engine includes a group remove operation that removes a specified group from the process data access server.

15. The process data access server of claim 12 wherein the set of interface operations executable by the data access server engine includes operations for modifying the contents of the first logical group.

16. The process data access server of claim 1 wherein the set of interface operations executable by the data access server engine includes a write operation to a specified data item accessible by the process data access server.

17. The process data access server of claim 1 wherein the set of interface operations includes a data reference structure search operation that returns a data item reference corresponding to a data item value accessible by the client applications via the process data access server.

18. The process data access server of claim 17 wherein the data item reference is a handle.

19. The process data access server of claim 1 wherein the set of interface operations includes an error code generator that supplies error code text to a requesting client data exchange protocol module.

20. The process data access server of claim 1 wherein the set of interface operations includes a status reporter operation that provides access to a data structure that stores status values for the process data access server.

21. A method for activating a data access server through a start-up process that builds the data access server from previously installed program files including at least an executable file incorporating a data access server engine and a separate and distinct file containing one or more of a set of client application data exchange protocol modules installed on the data access server, and wherein the set of client application data exchange protocol modules invoke a set of data access operations executable by the data access server engine of the data access server according to a module-engine interface definition, the method comprising the steps of:
    starting up an executable corresponding to the data access server and including the data access server engine;
    loading the set of client application data exchange protocol modules thereby creating program links between at least one of the protocol modules and the data access server executable; and
    instantiating a data access server object corresponding to a connection between the data access server and a requesting client application.

22. The method of claim 21 wherein the set of client data exchange protocol modules comprise plugins.

23. The method of claim 22 wherein at least one of the set of client data exchange protocol plugins comprises a dynamic plugin.

24. The method of claim 22 wherein at least one of the set of client data exchange protocol plugins comprises a static plugin.

25. The method of claim 22 wherein the set of protocol conversion modules comprise both static and dynamic plugins.

26. The method of claim 21 wherein ones of the set of client data exchange protocol modules handle data access requests from client applications in accordance with particular client data exchange protocols.

27. The method of claim 21 wherein the set of operations of the data access server engine includes at least one data access operation callable by at least two distinct ones of the set of client data exchange protocol modules that incorporate distinct data exchange protocols.

28. A process data access server enabling client applications incorporating potentially multiple differing data exchange protocols to access process data stored at potentially many different locations in a process control system, the process data access server comprising:
    a device protocol interface facilitating accessing process data storage locations within the process control system;
    a set of client data exchange protocol modules enabling client applications to request access to process data storage locations via the process data access server according to particular client data exchange protocols supported by the set of client data exchange protocol modules; and
    a data access server engine for executing process data access requests, received by the process data access server via the set of client data exchange protocol modules, by accessing, via the device protocol interface, data storage locations corresponding to the process data access requests, and wherein the data access server engine includes a client application data exchange protocol abstraction layer comprising a set of operations callable by ones of the set of client data exchange protocol modules in response to receipt by the set of client data exchange protocol modules of process data access requests; and
    wherein an operational data access server including the device protocol interface, the set of client data exchange protocol modules, and the data access server is created by a startup process that builds the operational data access server from previously installed program files, and wherein the program files of the client data exchange protocol modules and the data access server are independently designateable with regard of one another.

29. The process data access server of claim 28 wherein the set of client data exchange protocol modules comprise plugins.

30. The process data access server of claim 29 wherein at least one of the set of client data exchange protocol plugins comprises a dynamic plugin.

31. The process data access server of claim 29 wherein at least one of the set of client data exchange protocol plugins comprises a static plugin.

32. The process data access server of claim 29 wherein the set of protocol conversion modules comprise both static and dynamic plugins.

33. The process data access server of claim 28 wherein ones of the set of client data exchange protocol modules handle data access requests from client applications in accordance with particular client data exchange protocols.

34. The process data access server of claim 28 further including:
    a loading mechanism for determining a presence of at least one of the set of client data exchange protocol modules upon a machine for executing the process data access server, and loading the at least one client data exchange protocol module during a startup process that integrates the at least one client data exchange module with the data access server engine.

35. The process data access server of claim 28 wherein the set of operations of the data access server engine includes at least one operation callable by at least two distinct ones of the set of client data exchange protocol modules that incorporate distinct data exchange protocols.

36. The process data access server of claim 28 wherein the set of interface operations executable by the data access server engine includes an asynchronous data read operation for providing data from an identified data source in response to a client application data request.

37. The process data access server of claim 28 wherein the set of interface operations executable by the data access server engine includes a synchronous read operation that, in accordance with a timer duration expiration event, updates identified process data values via the device protocol interface.

38. The process data access server of claim 37 wherein the synchronous read operation discards an updated process data value for a data item that is determined to be unchanged from a current stored value for the data item, thereby avoiding transmissions of unchanged data values between the process data access server and requesting client applications.

39. The process data access server of claim 28 wherein the set of interface operations executable by the data access server engine includes a group creation operation that creates a first logical group containing a first set of data items.

40. The process data access server of claim 39 wherein a second logical group containing a second set of data items is includable as an item within the first logical group containing the first set of data items.

41. The process data access server of claim 39 wherein the set of interface operations executable by the data access server engine includes a group remove operation that removes a specified group from the process data access server.

42. The process data access server of claim 28 wherein the set of interface operations executable by the data access server engine includes operations for modifying the contents of the first logical group.

43. The process data access server of claim 28 wherein the set of interface operations executable by the data access server engine includes a write operation to a specified data item accessible by the process data access server.

44. The process data access server of claim 28 wherein the set of interface operations includes a data reference structure search operation that returns a data item reference corresponding to a data item value accessible by the client applications via the process data access server.

45. The process data access server of claim 44 wherein the data item reference is a handle.

46. The process data access server of claim 28 wherein the set of interface operations includes an error code generator that supplies error code text to a requesting client data exchange protocol module.

47. The process data access server of claim 28 wherein the set of interface operations includes a status reporter operation that provides access to a data structure that stores status values for the process data access server.

* * * * *

UNITED STATES PATENT AND TRADEMARK OFFICE
CERTIFICATE OF CORRECTION

PATENT NO. : 7,644,120 B2  Page 1 of 1
APPLICATION NO. : 09/954508
DATED : January 5, 2010
INVENTOR(S) : Todorov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2105 days.

Signed and Sealed this

Sixteenth Day of November, 2010

David J. Kappos
*Director of the United States Patent and Trademark Office*